US012206794B2

(12) United States Patent
Omori et al.

(10) Patent No.: US 12,206,794 B2
(45) Date of Patent: Jan. 21, 2025

(54) USER INFORMATION MANAGEMENT SYSTEM, USER INFORMATION MANAGEMENT METHOD, USER AGENT AND PROGRAM

(71) Applicant: Nippon Telegraph and Telephone Corporation, Tokyo (JP)

(72) Inventors: Yoshihiko Omori, Musashino (JP); Takao Yamashita, Musashino (JP); Yurika Suga, Musashino (JP); Yasuhiko Yoshimura, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 261 days.

(21) Appl. No.: 17/908,446

(22) PCT Filed: Mar. 2, 2020

(86) PCT No.: PCT/JP2020/008756
§ 371 (c)(1),
(2) Date: Aug. 31, 2022

(87) PCT Pub. No.: WO2021/176537
PCT Pub. Date: Sep. 10, 2021

(65) Prior Publication Data
US 2023/0088787 A1    Mar. 23, 2023

(51) Int. Cl.
*H04L 9/32* (2006.01)
*H04L 9/08* (2006.01)
(Continued)

(52) U.S. Cl.
CPC ............ *H04L 9/3247* (2013.01); *H04L 9/088* (2013.01); *H04L 9/30* (2013.01); *G06F 21/64* (2013.01); *H04L 9/32* (2013.01)

(58) Field of Classification Search
None
See application file for complete search history.

(56) References Cited

U.S. PATENT DOCUMENTS 11,721,148 B2\* 8/2023 Omori ............... E05B 49/00
340/5.64
2010/0161970 A1\* 6/2010 Lee ..................... H04L 9/321
707/E17.008

(Continued)

OTHER PUBLICATIONS

[No Author Listed] [online], "Hyperledger Indy," hyperledger.org, retrieved on Feb. 17, 2020, retrieved from URL <https://www.hyperledger.org/projects/hyperledger-indy>, 4 pages.

(Continued)

*Primary Examiner* — Lashonda Jacobs-Burton
(74) *Attorney, Agent, or Firm* — Fish & Richardson P.C.

(57) ABSTRACT

A user agent stores a private key and a public key of a user, and user information (registered user information). The user agent receives from a user terminal a service document including identification information of a service provider server and a user information classification requested by the service provider server, and adds a signature to the service document by using the private key of the user. The user terminal receives the signed service document and transmits the signed service document to the service provider server. The user agent receives the signed service document from the service provider server, and verifies the signature and transmits back to the service provider server the user information of the user corresponding to the included user information classification.

6 Claims, 18 Drawing Sheets

(51) Int. Cl.
*H04L 9/30* (2006.01)
*G06F 21/64* (2013.01)

(56) References Cited

U.S. PATENT DOCUMENTS

2020/0145225 A1* 5/2020 Faye .................... H04L 9/3247
2020/0153606 A1* 5/2020 Li ........................ H04L 9/3239
2020/0389462 A1* 12/2020 Murdoch .............. H04L 9/3239
2023/0409753 A1* 12/2023 Ogura .................. H04L 9/3247

OTHER PUBLICATIONS

Reed et al., "Decentralized Identifiers (DIDs) v1.0 Core Data Model and Syntaxes," W3C Working Draft, Jan. 22, 2020, retrieved from URL <https://w3c.github.io/did-core/>, 55 pages.

* cited by examiner

USER INFORMATION MANAGEMENT SYSTEM, USER INFORMATION MANAGEMENT METHOD, USER AGENT AND PROGRAM

CROSS-REFERENCE TO RELATED APPLICATIONS

This application is a National Stage application under 35 U.S.C. § 371 of International Application No. PCT/JP2020/008756, having an International Filing Date of Mar. 2, 2020, the disclosure of which is considered part of the disclosure of this application, and is incorporated by reference in its entirety into this application.

TECHNICAL FIELD

The present invention relates to a user information management system, a user information management method, a user agent, and a program for managing distribution of user information.

BACKGROUND ART

Service providers of major social networking service (SNS) sites, search sites, mail-order sites, and the like not only have a monopolistic position in their business fields, but also assume an advantageous position in that it is possible to accumulate personal information of users. Use of the personal information has an advantage that advanced services can be provided; however, there have been cases in which the personal information leaks or the personal information is provided to third parties without user's notice, resulting in social problems.

To address the above problem, a concept of self-sovereign identity (SSI) is widely used and is being standardized (NPL 1) such that users, instead of such a service provider managing the personal information, are capable of managing (controlling) their own personal information. According to the SSI, user information (user credentials) including user's address and qualifications is stored in a service endpoint. In response to a request from the service provider, the service endpoint transmits the user information. When an access right to the user information in the service endpoint is controlled, it is possible for the user to control a destination (a distribution destination, and a transfer destination) to which the user information is linked.

Examples of solution other than the SSI include personal information management using a distributed ledger (NPL 2). Information defining the user information is recorded in the distributed ledger by an issuance entity (user information issuance entity) of the user information. Examples of the user information issuance entity include a municipality that issues user information including a year, month, and day of birth or an address, or a university that issues a graduation certificate. The user requests the user information issuance entity to provide the user information and transmits the provided user information to the service provider. The user himself/herself transmits the user information to the service provider, and thus, it is possible to control a transfer destination of the user information of the user.

CITATION LIST

Non Patent Literature

NPL 1: Decentralized Identifiers (DIDs) v1.0, W3C Working Draft, The World Wide Web Consortium, 16 Feb. 2020, [online], [Search on Feb. 17, 2020], Internet <https://w3c.github.io/did-core/>

NPL 2: Hyperledger Indy, The Linux Foundation, [online], [Search on Feb. 17, 2020], Internet <https://www.hyperledger.org/projects/hyperledger-indy>

SUMMARY OF THE INVENTION

Technical Problem

The SSI has a problem in that the service endpoint passes unnecessary user information. For example, the user information includes a year, month, and day of birth. Even if it is enough for the service provider to verify that a user is an adult, the SSI does not have a mechanism in which the user information, that is, the year, month, and day of birth, is abstracted (roughened in granularity) into the user information indicating that the user is an adult and then such abstracted information is transmitted to the service provider. As a result, the unnecessary user information (personal information), that is, the year, month, and day of birth, is passed to the service provider. Another problem is that it is not possible to control distribution of the user information after the user information is transmitted. For example, even if the service provider acquiring the user information transfers such information to an outsource partner/collaboration partner affiliated in offering a service, there is no way for the user to know such a transfer.

In the distributed ledger, if user information is updated, unless a user reports the update of the user information to a service provider, the old user information remains unchanged. If the service provider attempts to obtain the most recent user information, the service provider needs to inquire the user every time to acquire such information.

As described above, the SSI and the distributed ledgers have problems about management of user information including control of distribution of the user information such as control of a distribution destination/transfer destination of the user information, update or expiration of the transferred user information, recognition (tracing) of the distribution destination, and control of abstraction/granularity of the user information.

In light of such a background, an object of the present invention is to allow a user to control distribution of user information related to the user.

Means for Solving the Problem

To solve the problems described above, a user information management system according to the present invention is a user information management system configured to include a user terminal used by a user, a user agent, and a service provider server. The user agent includes a storage unit configured to store a user information database in which a public key and a private key of the user, user identification information, and user information being a user attribute are associated with each other and stored, and a privilege transfer unit configured to receive from the user terminal a request with a service document including identification information of the service provider server and a user information classification being a classification of the user information requested by the service provider server, and generate and transmit back a signed service document obtained by adding a signature to the service document by using the private key of the user of the user terminal. The user terminal transmits the signed service document to the service provider server, the service provider server transmits the signed service document to the user agent, and the user agent further includes a user information provision unit configured to verify the signature of the signed service document by using the public key of the user, and to transmit back to the service provider server registered user information being the user information of the user which is included in the user information database and corresponding to the user information classification included in the signed service document.

Effects of the Invention

According to the present invention, it is possible for a user to control distribution of user information related to the user.

DESCRIPTION OF EMBODIMENTS

Overview of User Information Management System

Figure 1:
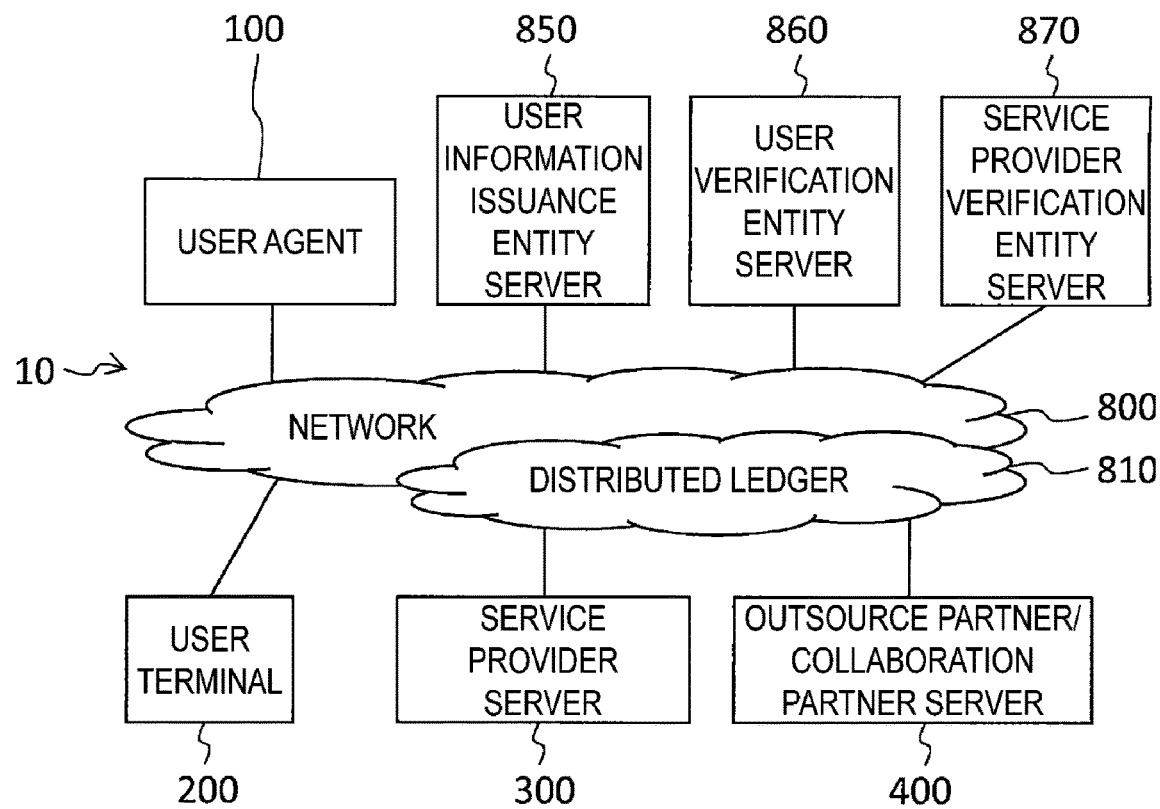
FIG. 1 is a diagram illustrating an overall configuration of a user information management system according to the present embodiment.

A user information management system in a form (an embodiment) for implementing the present invention will be described below. FIG. 1 is a diagram illustrating an overall configuration of a user information management system 10 according to the present embodiment. The user information management system 10 is configured to include a user agent 100, a user terminal 200, and a service provider server 300. The user information management system 10 may further include an outsource partner/collaboration partner server 400 operated by an outsource partner/collaboration partner of a service provided by a service provider to a user, a distributed ledger 810, a user information issuance entity server 850, a user verification entity server 860, and a service provider verification entity server 870. The user agent 100, the user terminal 200, the service provider server 300, the outsource partner/collaboration partner server 400, the distributed ledger 810, the user information issuance entity server 850, the user verification entity server 860, and the service provider verification entity server 870 can communication with one another via a network 800.

The user information issuance entity server 850 issues user information. The signature by the user information issuance entity server 850 is added to the user information. The user verification entity server 860 verifies a user's identity and signs a decentralized identity (DID) document described below. The service provider verification entity server 870 confirms the authenticity of a service document described below and signs the service document.

The distributed ledger 810 includes a plurality of servers, stores the service document and the DID document described below, and acquisition history of the user information, and in response to a request from the user terminal 200 and the service provider server 300, provides these documents and the acquisition history.

Before configurations of the user agent 100, the user terminal 200, the service provider server 300, and the outsource partner/collaboration partner server 400 are described, the user information and an overview of processing in the user information management system 10 that deals with the user information will be described.

Overview of User Information Management System: User Information

The user information (user credential) is information (user attribute) related to a user including a year, month, and day of birth or an educational background, and is issued from the user information issuance entity server 850. In providing a service, the service provider server 300 and the outsource partner/collaboration partner server 400 acquire the user information when the user applies for registration with a service or when the service is provided, utilize the user information to provide the service, and verify if the user is eligible to provide the service, for example. For example, the service provider server 300 and the outsource partner/collaboration partner server 400 acquire, for a housing loan service, a withholding record issued by a company where the user is employed and use the acquired withholding record for loan examination, and verify, for a liquor sales website, if the user is an adult.

The service provider server 300 and the outsource partner/collaboration partner server 400 describe, in the service document, user information requirements to provide the services of the service provider and the outsource partner/collaboration partner. The user information requirements described in the service document include the classification of user information including a year, month, and day of birth or an educational background, and the classification of user information is also referred to as a user information classification. The user refers to the service document of the service provider server 300 to confirm the user information requirements by the service provider and determine whether to use the service. Note that if the service provider server 300 provides a service not by itself but in collaboration (cooperation) with the outsource partner/collaboration partner server 400, the user confirms the user information described in a service document of the outsource partner/collaboration partner server 400 to determine whether to use the service.

Figure 2:
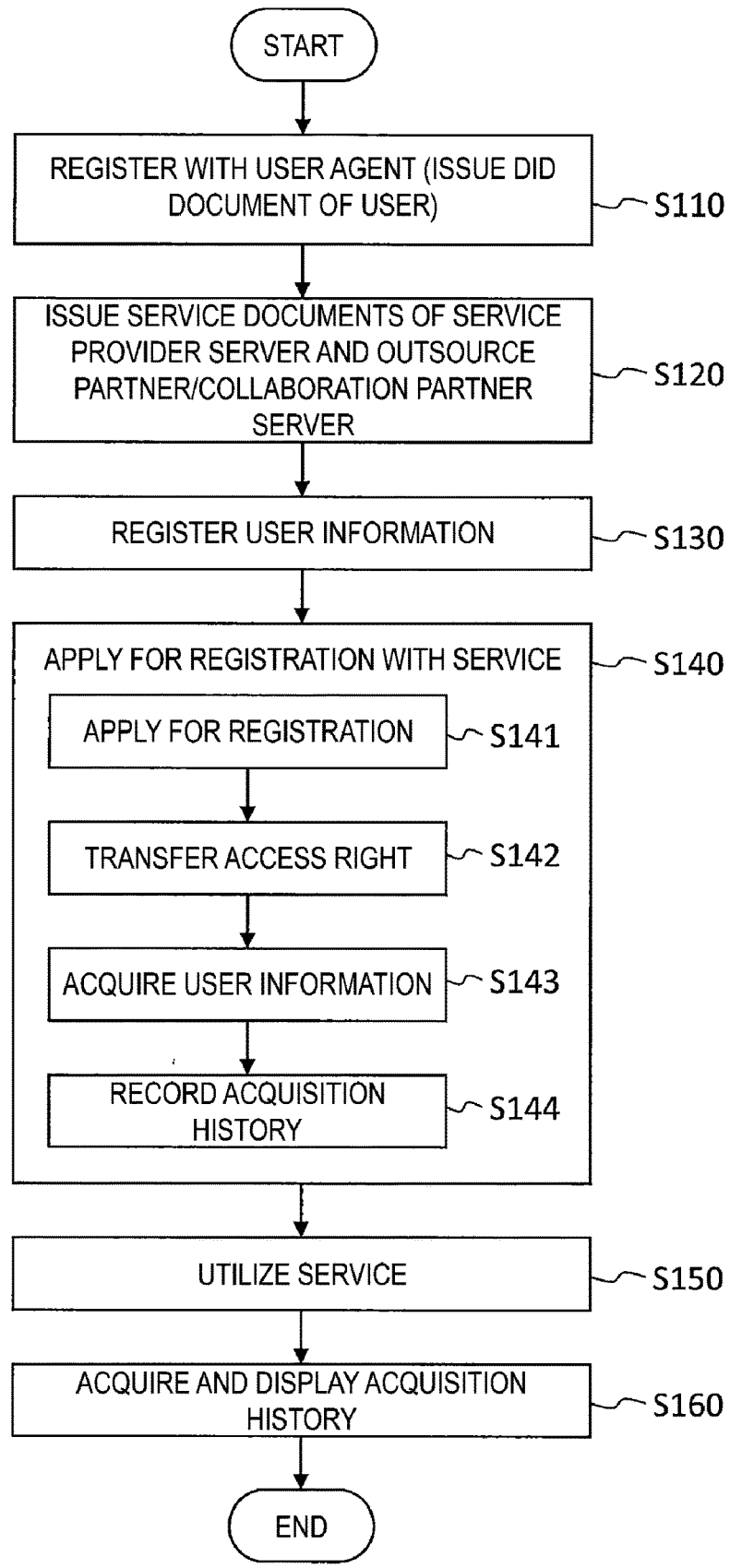
FIG. 2 is a flowchart illustrating an overview of processing in the user information management system according to the present embodiment.

Overview of User Information Management System: Flow of User Information Management FIG. 2 is a flowchart illustrating an overview of processing in the user information management system 10 according to the present embodiment.

In step S110, in response to reception of a request for registering a user with the user agent 100 from the user terminal 200, the user agent 100 registers the user, issues the DID document of the user, and records the DID document into the distributed ledger 810. The DID document includes user identification information and a public key. The DID document may further include a location (for example, a universal location identifier (URI)) of the user agent 100. Note that a signature by the user verification entity server 860 is added to the DID document.

In step S120, the service provider server 300 and the outsource partner/collaboration partner server 400 issue the service documents of the service provider server 300 and the outsource partner/collaboration partner server 400 respectively and register the service documents with the distributed ledger 810. The service document of the service provider server 300 includes identification information of the service provider server 300, a public key, and user information requirement (a user information classification) for providing a service of the service provider server 300. In addition, the service document may include a location of the service provider server 300 and identification information of the outsource partner/collaboration partner server 400 being an outsource partner/collaboration partner of the service.

Note that a signature by the service provider verification entity server 870 is added to the service document. If the user terminal 200 and the user agent 100 refer to the service document, the signature added by the service provider verification entity server 870 is verified. Similarly to the service document of the service provider server 300, the service document of the outsource partner/collaboration partner server 400 includes identification information and a public key of the outsource partner/collaboration partner server 400, user information requirement for providing a service, and the like.

In step S130, the user terminal 200 requests the user information issuance entity server 850 to issue the user information and obtains the user information, and registers the obtained user information with the user agent 100. The user agent 100 stores the user information in addition to the identification information of the user, the public key, and the private key. The user information requirement included in the service document is the classification of user information such as a year, month, and day of birth, and the user information stored by the user agent 100 is user information specific to the user such as "Jan. 1, 2000".

In step S140, the user terminal 200 applies for registration of the user with the service to the service provider server 300. The registration application includes steps S141 to S144. In step S141, the user terminal 200 applies for registration of the user with the service to the service provider server 300.

In step S142, the user terminal 200 acquires the service document of the service provider server 300. If the service provider has an outsource partner/collaboration partner, the user terminal 200 also acquires the service document of the outsource partner/collaboration partner server 400. If the user permits provision of the user information which is included in the service document and necessary for the service, the user terminal 200 requests the user agent 100 to sign the service document with the private key of the user to acquire the signed service document and transmits the signed service document to the service provider server 300. The service document signed by the user proves that the access right to the user information is transferred to the service provider server 300. The same applies to the service document of the outsource partner/collaboration partner server 400.

In step S143, the service provider server 300 requests the user information from the user agent 100, by submitting the service document signed by the user. The user agent 100 verifies the signature of the user added to the service document to validate that the service provider server 300 has the access right to the user information described in the service document, and transmits the user information to the service provider server 300.

The user information transmitted by the user agent 100 is not limited to the user information registered in step S130, and additionally includes a minimum range of information (information having a rough granularity, highly abstracted information) corresponding to the user information described in the service document. For example, if the user information requirement described in the service document is user information as to whether the user is an adult, the user agent 100 determines based on the year, month, and day of birth whether the user is an adult and transmits the resulting determination only. If the user information requirement described in the service document is a resident prefecture, the user agent 100 transmits only a prefecture out of an address of the user. Note that similarly to the service provider server 300, the outsource partner/collaboration partner server 400 also acquires the user information.

In step S144, the user agent 100 records a history of the service provider server 300 acquiring the user information, into the distributed ledger 810.

Thus, the user has been registered with the service provided by the service provider server 300, and the user is capable of using the service.

In step S150, the user utilizes the service provided by the service provider server 300 by utilizing the user terminal 200.

In step S160, the user terminal 200 acquires the acquisition history of the user information from the distributed ledger 810 and displays the acquired acquisition history. This allows the user to confirm what part of the user information is acquired by which service provider server 300 or outsource partner/collaboration partner server 400.

Configuration of User Agent

Figure 3:
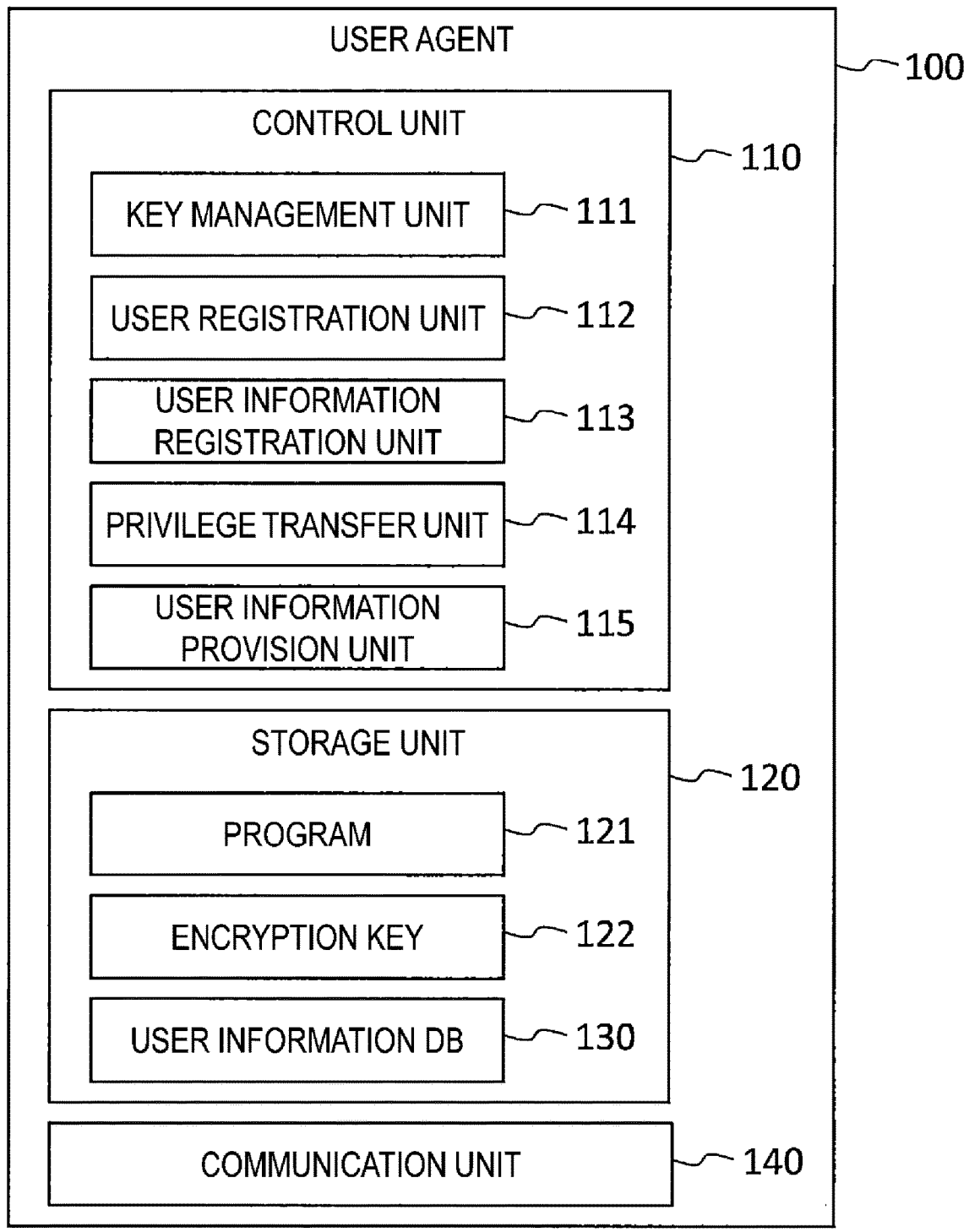
FIG. 3 is a functional block diagram of a user agent according to the present embodiment.

FIG. 3 is a functional block diagram of the user agent 100 according to the present embodiment. The user agent 100 includes a control unit 110, a storage unit 120, and a communication unit 140. The communication unit 140 transmits and receives communication data among the user terminal 200, the service provider server 300, and the outsource partner/collaboration partner server 400.

The storage unit 120 includes a storage device such as a random access memory (RAM) or a solid state drive (SSD). The storage unit 120 stores a program 121, an encryption key 122, and a user information database 130 (described as user information DB in FIG. 3). The program 121 includes a processing procedure of the user agent 100 in the processing for registering a user (see step S110 in FIG. 2 and see FIG. 8 described below), the processing for transferring an access right (see step S142 and FIG. 12 described below), the processing for acquiring user information (see step S143 and FIG. 13 described below), and the like that are executed by the control unit 110. The encryption key 122 is an encryption key for authenticating and encrypting communication data in communication among the user terminal 200, the service provider server 300, and the outsource partner/collaboration partner server 400.

Figure 4:
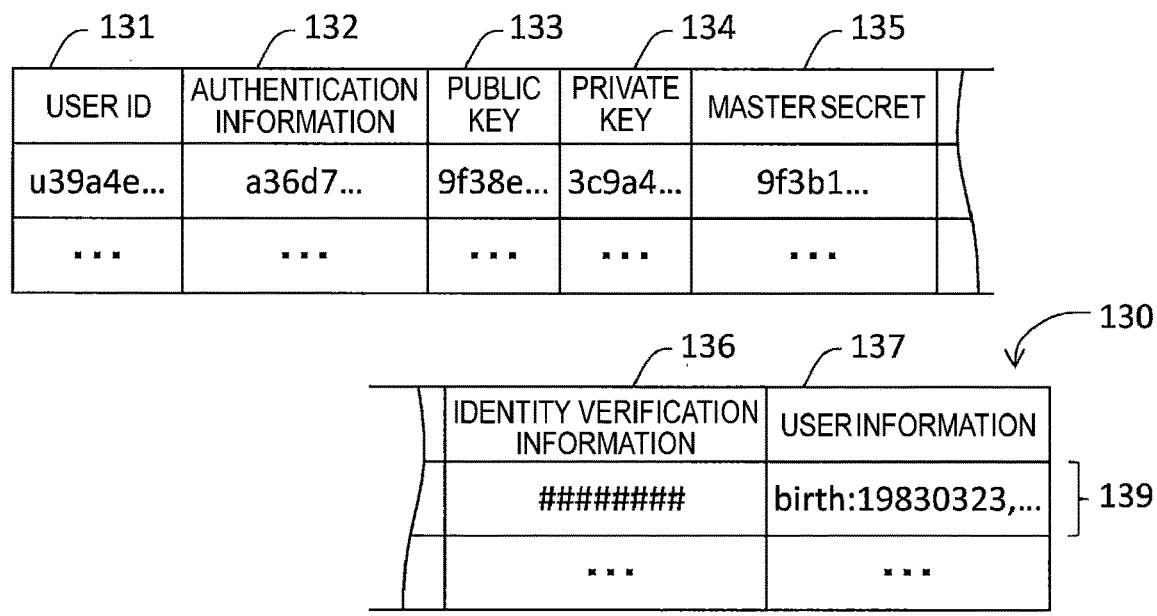
FIG. 4 is a data structure diagram of a user information database according to the present embodiment.

FIG. 4 is a data structure diagram of the user information database 130 according to the present embodiment. The user information database 130 is, for example, data in a table format stored in a secure area of the user agent 100, and includes information on the user of the user terminal 200. One row (record) of the user information database 130 indicates one user and includes columns (attributes) of the user identification information 131 (described as a user ID in FIG. 4), authentication information 132, a public key 133, a private key 134, a master secret 135, identity verification information 136, and user information 137.

The user identification information 131 is identification information of the user included in the DID document described below.

The authentication information 132 is information used for authentication of the user terminal 200 in communication with the user terminal 200. The authentication information 132 is, for example, a public key of the user terminal 200 and a password used for the user authentication. The public key 133 and the private key 134 are a pair of a public key and an encryption key. The public key 133 is included in the DID document.

The master secret 135 is information used in secrecy processing described below.

The identity verification information 136 is information including a name or a driver license number used by the user agent 100 to verify a user identity.

The user information 137 is one or more registered user information items acquired by the user from the user information issuance entity server 850. Note that when the user is initially registered, the user information 137 does not include any user information.

In a record 139, the user identification information 131 is "u39a4e . . . " and in the user information 137, the user information of a year, month, and day of birth is registered.

Returning to FIG. 3, the control unit 110 is constituted by a central processing unit (CPU) and includes a key management unit 111, a user registration unit 112, a user information registration unit 113, a privilege transfer unit 114, and a user information provision unit 115. The key management unit 111 generates the public key 133 and the private key 134 of the user. The key management unit 111 generates an encryption key used for communication and an encryption key used for processing for acquiring user information (see FIG. 13 below).

The user registration unit 112 executes processing for registering a user with the user agent 100 (see FIG. 8 described below). Specifically, the user registration unit 112 generates the user identification information 131 (see FIG. 4), the public key 133, the private key 134, and the master secret 135. Next, the user registration unit 112 generates the DID document including the user identification information 131 and the public key 133 and registers the generated DID document with the distributed ledger 810.

The user information registration unit 113 registers the user information transmitted from the user terminal 200 with the user information database 130.

The privilege transfer unit 114 executes the processing for transferring an access right (see FIG. 12 below). Specifically, the privilege transfer unit 114 signs the service document of the service provider server 300 and the outsource partner/collaboration partner server 400 transmitted by the user terminal 200 by using the private key 134 of the user (see FIG. 4).

The user information provision unit 115 provides the user information in response to a request of the service provider server 300 and the outsource partner/collaboration partner server 400. In particular, the user information provision unit 115 verifies the signature of the user added to the service document to validate the requested user information with the access right owned by the service provider server 300 and the outsource partner/collaboration partner server 400. Next, the user information provision unit 115 acquires, from the user information 137, the user information corresponding to the requested user information, converts the acquired user information into the requested user information to transmit such user information.

For example, if the user information described in the service document is a resident prefecture, the user information provision unit 115 only transmits a resident prefecture out of an address of the user. Such a technique is also called secrecy processing, and is described in the following document, for example: Jan Camenisch and Anna Lysyanskaya, "An Efficient System for Non-transferable Anonymous Credentials with Optional Anonymity Revocation," Advances in Cryptology Eurocrypt 2001, pp. 93-117. Note that in the secrecy processing, the user information provision unit 115 uses the master secret 135 (see FIG. 4).

Configuration of User Terminal

Figure 5:
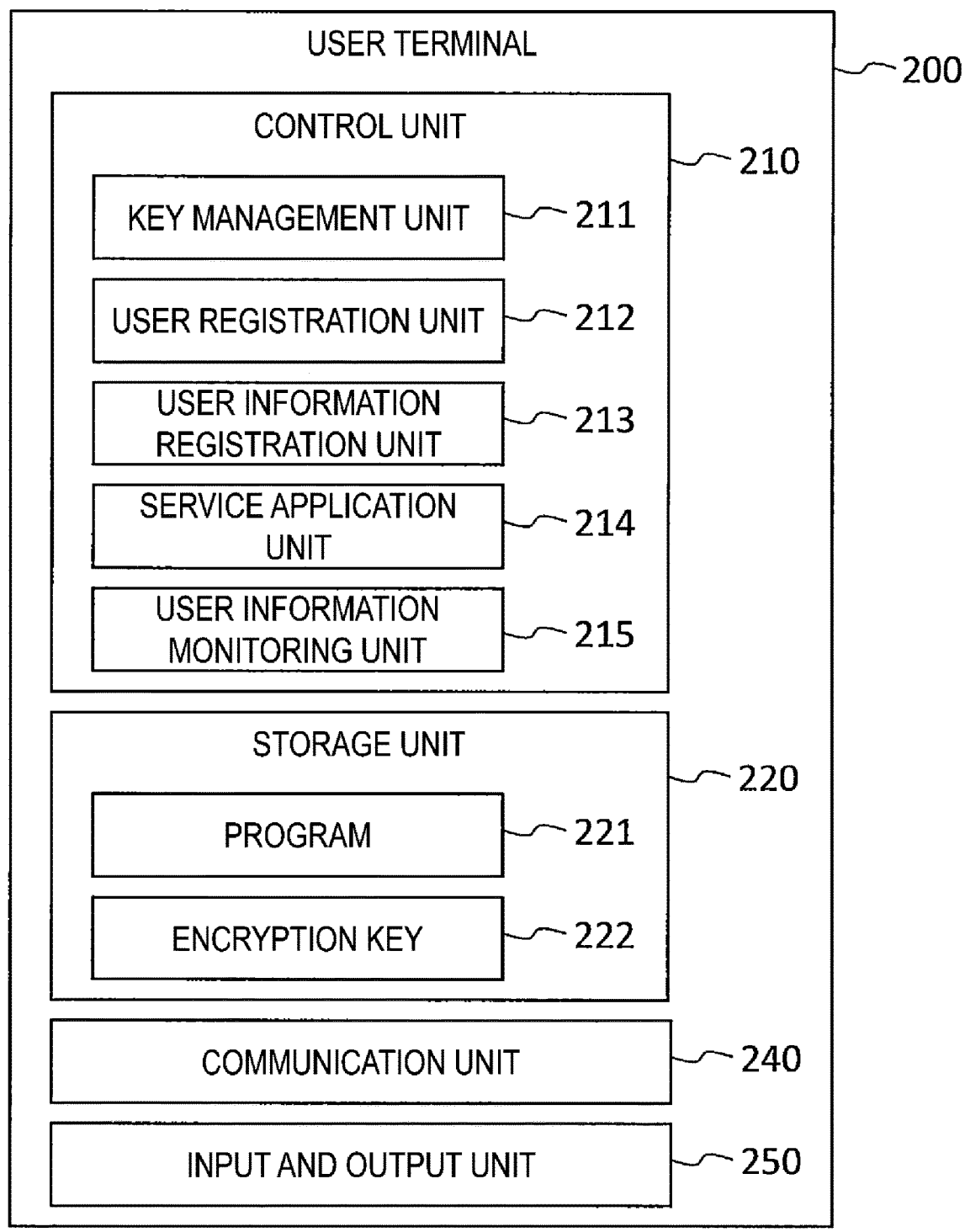
FIG. 5 is a functional block diagram of a user terminal according to the present embodiment.

FIG. 5 is a functional block diagram of the user terminal 200 according to the present embodiment. The user terminal 200 includes a control unit 210, a storage unit 220, a communication unit 240, and an input and output unit 250. The communication unit 240 transmits and receives communication data to and from the user agent 100, the service provider server 300, the user information issuance entity server 850, and the like. The input and output unit 250 is a user interface, and includes a display, a keyboard, and a mouse, for example.

The storage unit 220 is constituted by a storage device such as RAM and SSD. The storage unit 220 stores therein a program 221 and an encryption key 222. The program 221 includes a processing procedure of the user terminal 200 in the processing for registering a user (see step S110 in FIG. 2 and FIG. 8 described below), the processing for transferring an access right (see step S142 and FIG. 12 described below), and the like that are executed by the control unit 210. The encryption key 222 is an encryption key for encrypting and authenticating communication data in communication among the user agent 100, the service provider server 300, the user information issuance entity server 850, and the like.

The control unit 210 is constituted by a CPU and includes a key management unit 211, a user registration unit 212, a user information registration unit 213, a service application unit 214, and a user information monitoring unit 215.

The key management unit 211 generates the encryption key 222.

The user registration unit 212 executes processing for registering a user with the user agent 100 (see step S110 in FIG. 2 and FIG. 8 described below).

The user information registration unit 213 acquires the user information from the user information issuance entity server 850 to register the acquired user information with the user agent 100 (see step S130 and FIG. 10 described below). The service application unit 214 applies for registration of the user with the service to the service provider server 300 (see steps S141 to S142 and FIG. 11 and FIG. 12 described below).

The user information monitoring unit 215 collects and displays the acquisition history of the user information of the user recorded in the distributed ledger 810 from the distributed ledger 810 (see step S160 and FIG. 14 described below).

Configuration of Service Provider Server

Figure 6:
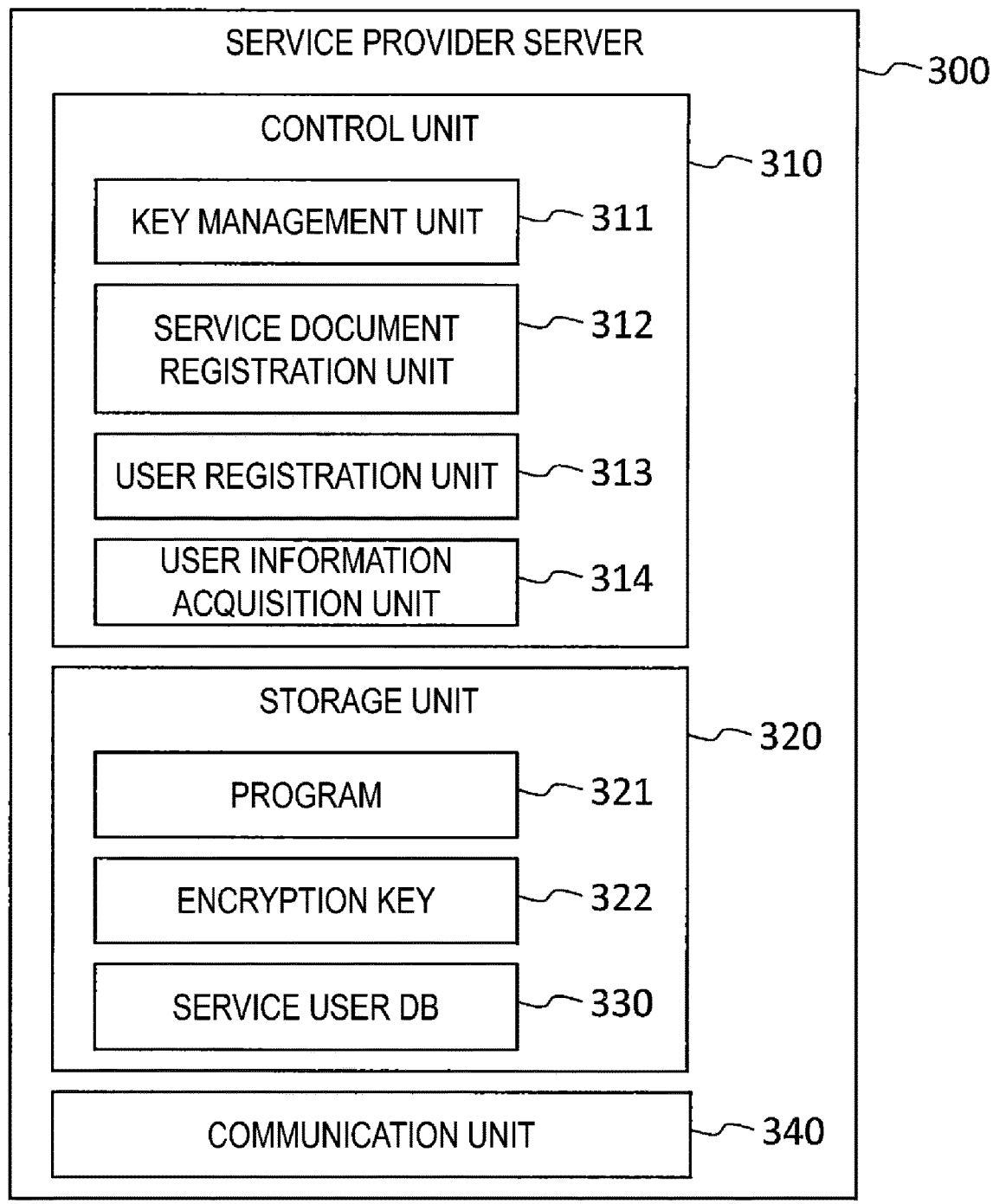
FIG. 6 is a functional block diagram of a service provider server according to the present embodiment.

FIG. 6 is a functional block diagram of the service provider server 300 according to the present embodiment. Note that the functional configuration of the outsource partner/collaboration partner server 400 is similar to that of the service provider server 300. The service provider server 300 includes a control unit 310, a storage unit 320, and a communication unit 340. The communication unit 340 transmits and receives communication data to and from the user agent 100, the user terminal 200, and the outsource partner/collaboration partner server 400.

The storage unit 320 is constituted by a storage device such as a RAM and an SSD. The storage unit 320 stores therein a program 321, an encryption key 322, and a service user database 330 (described to as "service user DB" in FIG. 6). The program 321 includes a processing procedure of the service provider server 300 in the processing for issuing a service document (see step S120 in FIG. 2 and FIG. 9 described below), the processing for acquiring the user information from the user agent 100 (see step S143 and FIG. 13 described below), and the like that are executed by the control unit 310. The encryption key 322 is an encryption key for encrypting and authenticating communication data in communication among the user agent 100, the user terminal 200, the outsource partner/collaboration partner server 400, and the like. The encryption key 322 includes the public key and the private key of the service provider server 300.

Figure 7:
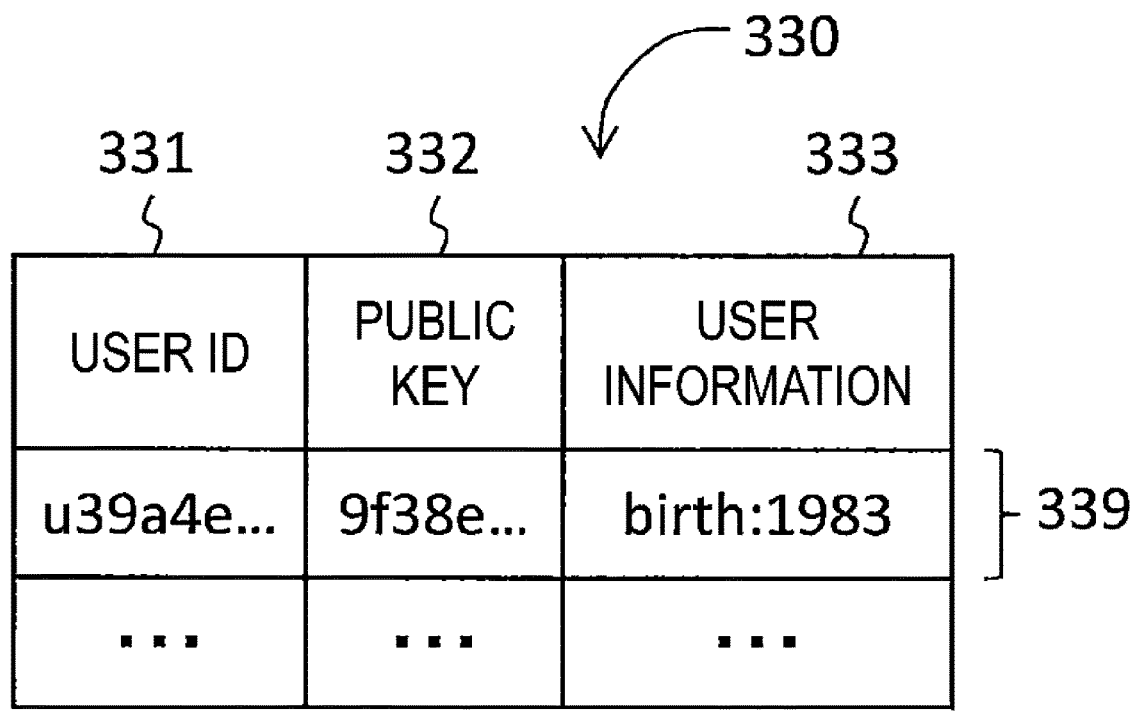
FIG. 7 is a data structure diagram of a service user database according to the present embodiment.

FIG. 7 is a data structure diagram of the service user database 330 according to the present embodiment. The service user database 330 is, for example, data in a table format, and includes information related to the user of the user terminal 200 utilizing the service of the service provider server 300. One row (record) of the service user database 330 indicates one user and includes user identification information 331 (described as a user ID in FIG. 7), a public key 332, and user information 333.

The user identification information 331 and the public key 332 are identification information and a public key of the user included in the DID document. The user identification information 331 and the public key 332 correspond to the user identification information 131 and the public key 133 (see FIG. 4), respectively.

The user information 333 is user information of the user acquired from the user agent 100. The user information 333 is the user information described in the service document, and is partial information (information having a rough granularity, abstracted information) of the user information 137 (see FIG. 4).

In a record 339, the user identification information 131 is "u39a4e . . . " and the user information of a year of birth is registered in the user information 137. Note that while the user having the record 339 is the same as the user having the record 139 (see FIG. 4), the user information 137 of the record 139 includes the year, month, and day of birth and the user information 333 of the record 339 includes the year of birth only.

Returning to FIG. 6, the control unit 310 is constituted by a CPU and includes a key management unit 311, a service document registration unit 312, a user registration unit 313, and a user information acquisition unit 314.

The key management unit 311 generates the encryption key 322.

The service document registration unit 312 issues the service document and registers the issued service document with the distributed ledger 810 (see step S120 and FIG. 9 described below).

The user registration unit 313 and the user information acquisition unit 314 apply for registration of the user with the service (see steps S141 to S143 and FIGS. 11 to 13 described below). In registering the user, the user registration unit 313 registers the identification information and the public key of the user with the service user database 330, and acquires the service document of the user registration unit 313 to which the user signature is added. The user information acquisition unit 314 presents the signed service document to the user agent 100 to acquire the user information and registers the acquired user information with the record of the user of the service user database 330 (see FIG. 13 described below).

Processing for Registering User with User Agent

Figure 8:
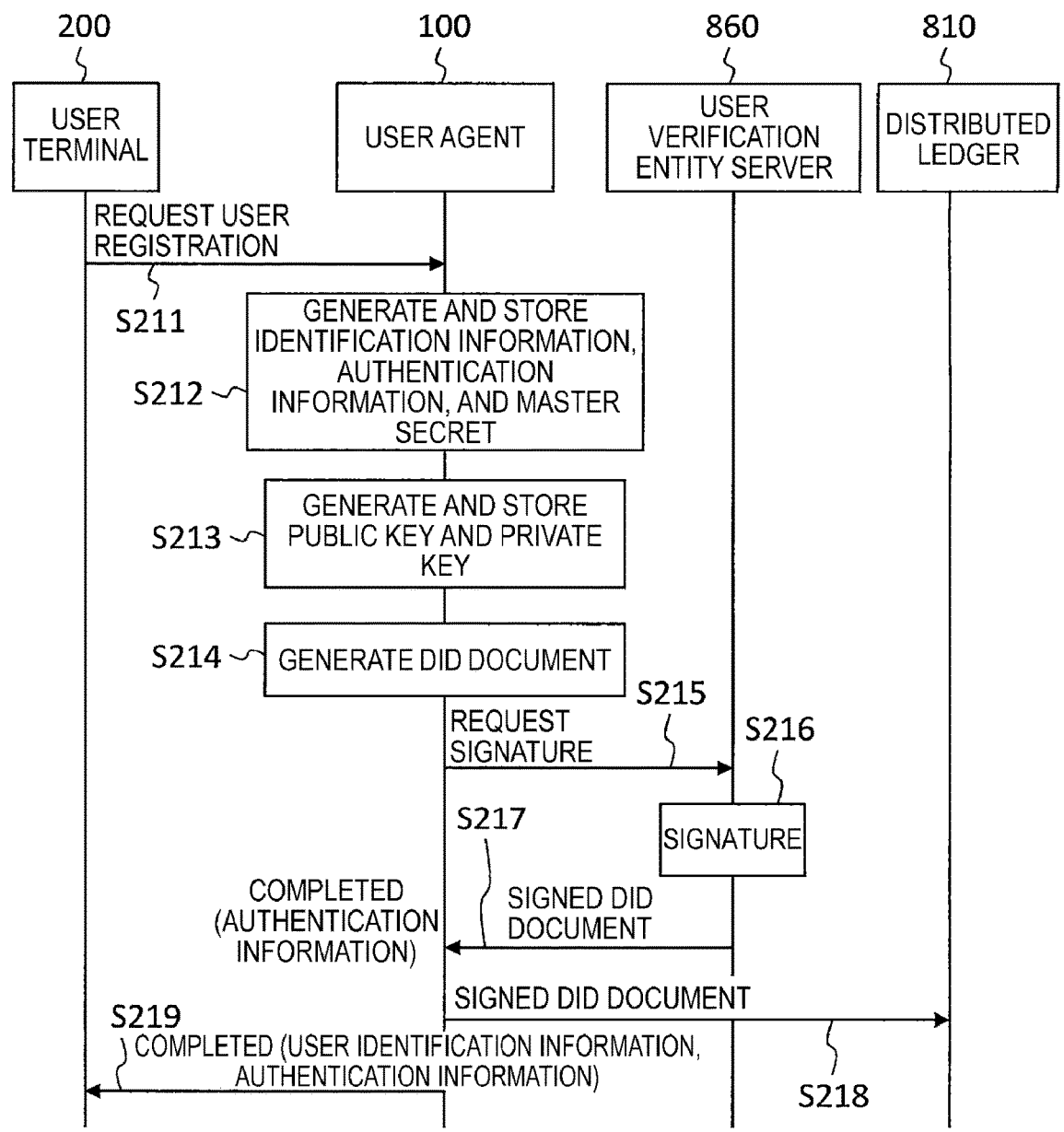
FIG. 8 is a sequence diagram of processing for registering a user with the user agent by the user according to the present embodiment.

FIG. 8 is a sequence diagram of processing for registering a user with the user agent 100 according to the present embodiment. With reference to FIG. 8, contents of the processing in step S110 (see FIG. 2) will be described. Note that it is assumed that communication between the user terminal 200 and the user agent 100 is encrypted, and the user terminal 200 already authenticates the user agent 100 being a communication partner.

In step S211, the user registration unit 212 of the user terminal 200 requests registration of the user with the user agent 100. The request includes information (identity verification information such as a copy of a driver's license) necessary for identity verification.

In step S212, the user registration unit 112 of the user agent 100 generates the identification information of the user (user identification information), authentication information, and a master secret. Next, the user registration unit 112 adds a record to the user information database 130, and stores the generated identification information of the user, authentication information, and the master secret, into each of the user identification information 131, the authentication information 132, and the master secret 135 of the added records. The authentication information is authentication information of the user terminal 200 used when the user terminal 200 accesses the user agent 100 after the processing for registering the user. The user registration unit 112 stores the identity verification information received in step S211 into the identity verification information 136.

In step S213, the key management unit 111 of the user agent 100 generates a pair of the public key and the private key of the user, and stores the generated pair of the public key and the private key into each of the public key 133 and the private key 134 of the record added in step S212.

In step S214, the user registration unit 112 generates a DID document including the user identification information, the public key, and a location of the user agent 100.

In step S215, the user registration unit 112 transmits the DID document generated in step S214 and the identity verification information received in step S211 to the user verification entity server 860 to request the DID document to be signed.

In step S216, the user verification entity server 860 verifies the identity verification information and signs the DID document. Note that if the verification of the identity verification information fails, the user verification entity server 860 notifies the user agent 100 of the verification failure. The user registration unit 112 notifies the user terminal 200 of the error, deletes the record of the user information database 130 added in step S212, and the processing ends in FIG. 8.

In step S217, the user verification entity server 860 returns the signed DID document to the user agent 100.

In step S218, the user registration unit 112 registers the signed DID document received in step S218 with the distributed ledger 810. Note that in the following description, the DID document signed by the user verification entity server 860 is simply described as a DID document, unless otherwise indicated.

In step S219, the user registration unit 112 transmits the user identification information and the authentication information generated in step S212 to the user terminal 200 to notify that the user registration is completed. The user terminal 200 stores the user identification information and the authentication information in the storage unit 220. Thereafter, when the user terminal 200 accesses the user agent 100, such authentication information is used.

Processing for Issuing Service Document

Figure 9:
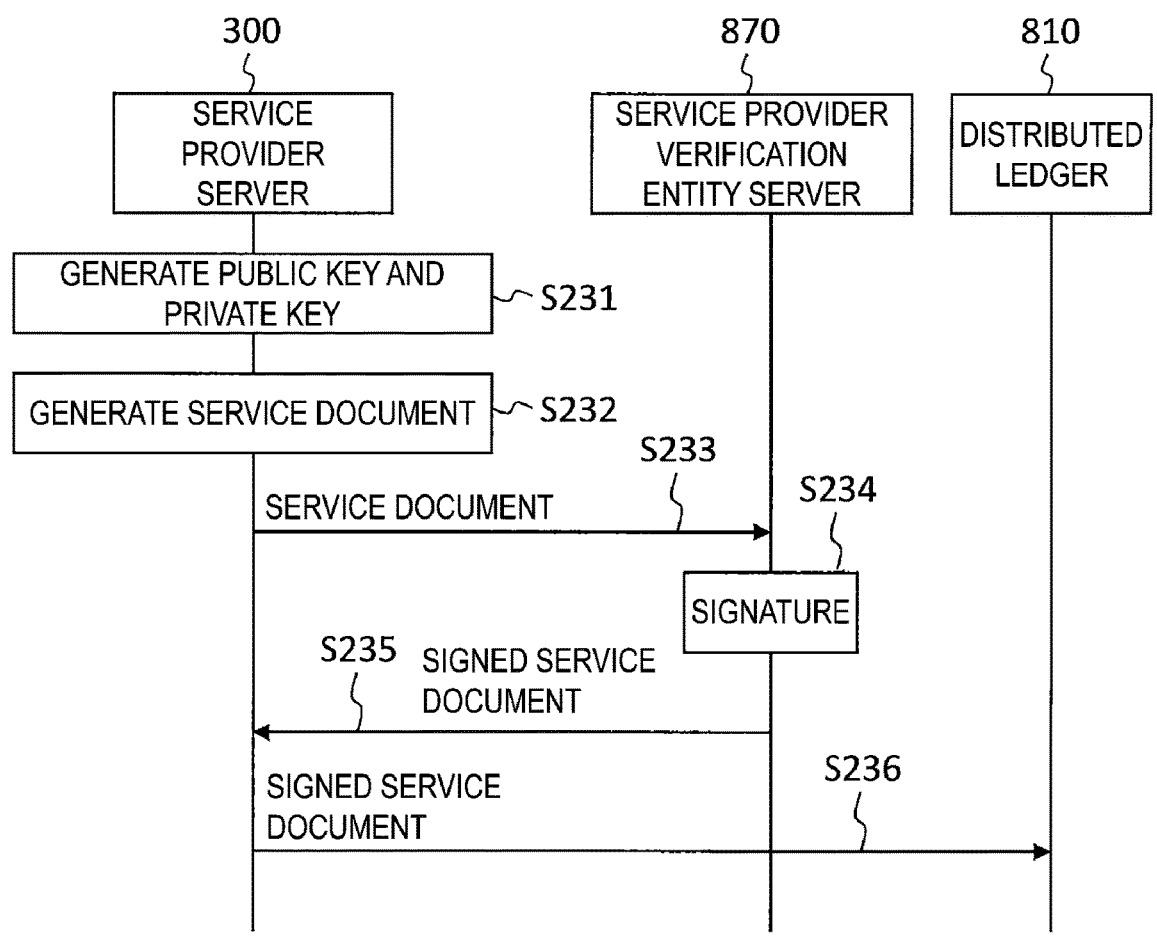
FIG. 9 is a sequence diagram of processing of issuing a service document by a service provider server according to the present embodiment.

FIG. 9 is a sequence diagram of processing for issuing a service document by the service provider server 300 according to the present embodiment. With reference to FIG. 9, contents of the processing in step in step S120 (see FIG. 2) will be described.

In step S231, the key management unit 311 of the service provider server 300 generates a pair of the public key and the private key and stores the generated pair into the encryption key 322.

In step S232, the service document registration unit 312 of the service provider server 300 generates the identification information of the service provider server 300. Next, the service document registration unit 312 generates the service document including the identification information, the public key generated in step S231, and the user information requirement. The user information requirement refers to a user information classification required for the service provider server 300 to provide the service to the user. The service document may include the identification information of the outsource partner/collaboration partner server 400, as a distribution destination of the user information. The service document may also include a location of the service provider server 300.

In step S233, the service document registration unit 312 transmits the service document generated in step S232 to the service provider verification entity server 870 to request the service document to be signed.

In step S234, the service provider verification entity server 870 confirms the contents of the service document and signs the service document.

In step S235, the service provider verification entity server 870 returns the signed service document to the service provider server 300.

In step S236, the service document registration unit 312 registers the service document received in step S235 with the distributed ledger 810.

Similarly to FIG. 9, the outsource partner/collaboration partner server 400 also generates the service document to be registered with the distributed ledger 810.

Processing for Registering User Information

Figure 10:
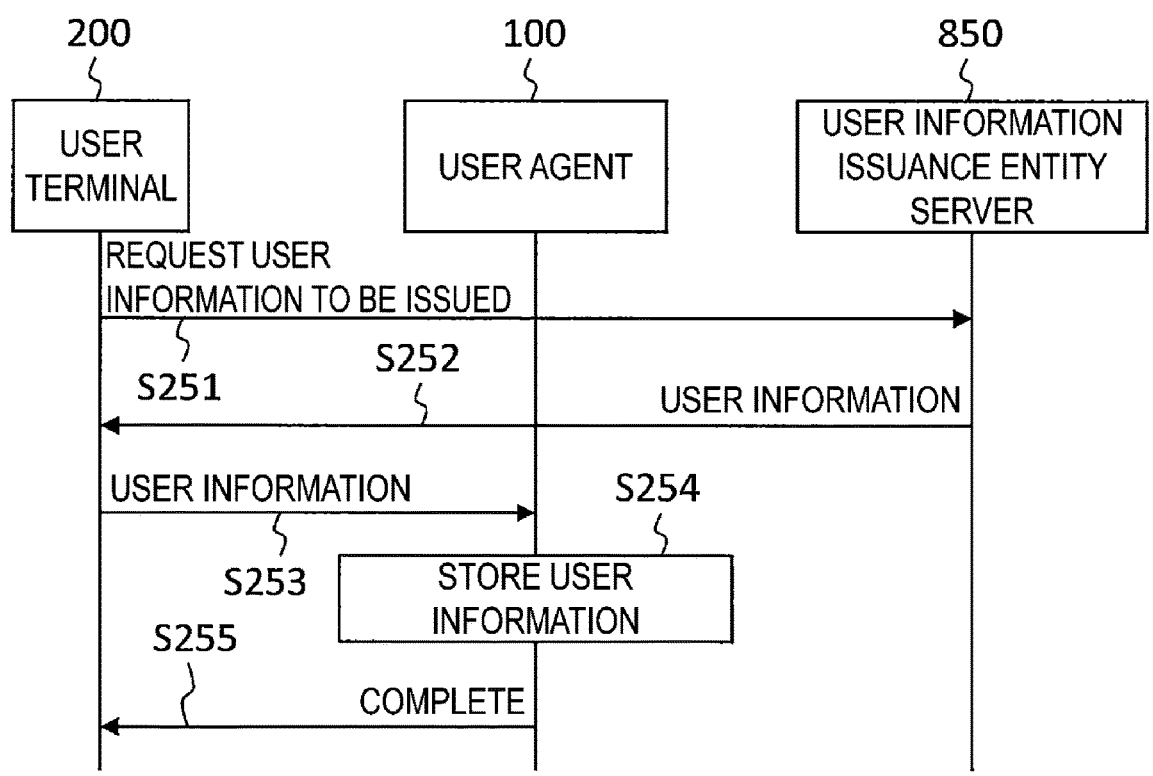
FIG. 10 is a sequence diagram of processing for registering user information according to the present embodiment.

FIG. 10 is a sequence diagram of processing for registering the user information according to the present embodiment. With reference to FIG. 10, contents of the processing in step in step S130 (see FIG. 2) will be described. Note that in the processing of FIG. 10, it is assumed that communication between the user terminal 200 and the user information issuance entity server 850 is encrypted and both the parties are authenticated with each other.

In step S251, the user information registration unit 213 of the user terminal 200 requests issuance of the user information. The request includes a classification of the user information to be issued.

In step S252, the user information issuance entity server 850 generates the user information and transmits the generated user information to the user terminal 200. The user information includes information for identifying the user such as a name of the user and information related to the user such as a qualification and the signature by the user information issuance entity server 850 is added to the user information.

In step S253, the user information registration unit 213 transmits the user information received in step S252 to the user agent 100.

In step S254, the user information registration unit 113 of the user agent 100 stores the user information received in step S253 in the user information database 130. Specifically, the user information registration unit 113 identifies the record of the user information database 130 corresponding to the user of the user terminal 200. Next, the user information registration unit 113 verifies whether the user information received in step S253 corresponds to the identity verification information 136 or the user information 137 of the identified record, and thereafter, adds the user information to the user information 137. Verifying such correspondence enables the detection of an attempt to register the user information of another user by the user terminal 200, making it possible to prevent registration of erroneous user information.

In step S255, the user information registration unit 113 notifies the user terminal 200 that the registration is complete.

Processing for Applying for Registration with Service

Figure 11:
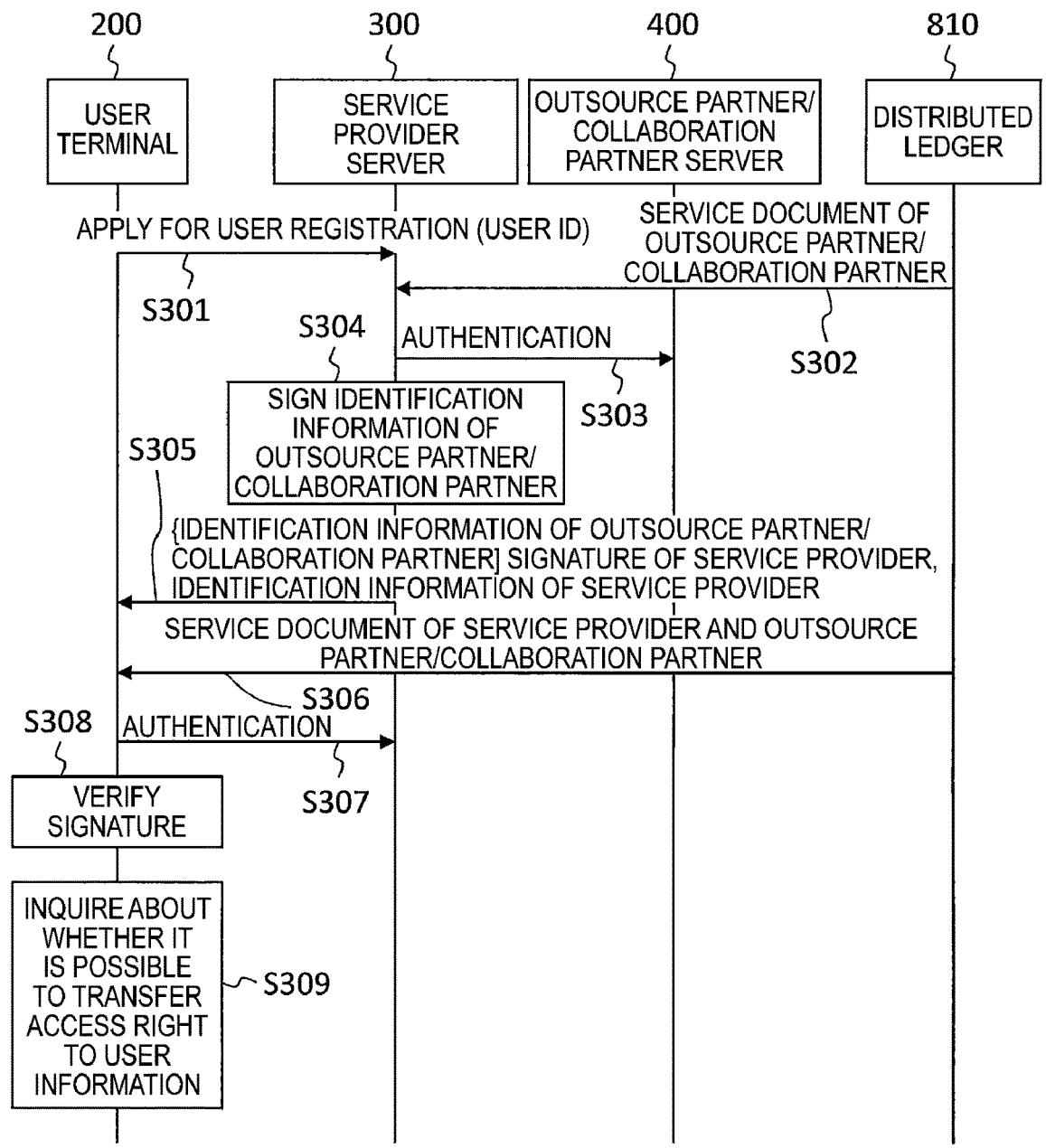
FIG. 11 is a sequence diagram of processing for applying for registering a user with a service according to the present embodiment.

FIG. 11 is a sequence diagram of processing for applying for registering the user with the service according to the present embodiment. With reference to FIG. 11, contents of the processing in step in step S141 (see FIG. 2) will be described. Note that it is assumed that the service provider server 300 already acquires the identification information of the outsource partner/collaboration partner server 400 affiliated to provide the service. Furthermore, in FIGS. 11 to 17, the service provider server 300 and the outsource partner/collaboration partner server 400 may be abbreviated as a service provider and an outsource partner/collaboration partner, respectively.

In step S301, the service application unit 214 of the user terminal 200 applies for registration of the user with the service to the service provider server 300. The application includes the identification information of the user (described as a user ID in FIG. 11).

In step S302, the user registration unit 313 of the service provider server 300 acquires the service document of the outsource partner/collaboration partner server 400 from the distributed ledger 810.

In step S303, the user registration unit 313 communicates with the outsource partner/collaboration partner server 400 to perform authentication. In the authentication, for example, challenge-response authentication is employed using the public key included in the service document of the outsource partner/collaboration partner server 400 acquired in step S302 to perform the authentication. When the authentication fails, the user registration unit 313 notifies the user terminal 200 of the error and cancels the processing of FIG. 11. The description is continued below on the assumption that the authentication is successful.

In step S304, the user registration unit 313 signs the identification information of the outsource partner/collaboration partner server 400 with the private key of the user registration unit 313. Note that in FIG. 11, the identification information of the outsource partner/collaboration partner server 400 signed by the service provider server 300 is described as "{identification information of outsource partner/collaboration partner} signature of service provider".

In step S305, the user registration unit 313 transmits, to the user terminal 200, the signed identification information of the outsource partner/collaboration partner server 400 and the identification information of the service provider server 300.

In step S306, based on the identification information of the outsource partner/collaboration partner server 400 and the service provider server 300 received in step S305, the service application unit 214 acquires, from the distributed ledger 810, the service documents of the outsource partner/collaboration partner server 400 and the service provider server 300.

In step S307, similarly to step S303, the service application unit 214 communicates with the service provider server 300 to perform the authentication. When the authentication fails, the service application unit 214 notifies the service provider server 300 of the error and cancels the processing of FIG. 11. The description is continued below on the assumption that the authentication is successful.

In step S308, the service application unit 214 verifies the signature of the service provider server 300 added to the identification information of the outsource partner/collaboration partner server 400 acquired in step S305. The public key included in the service document of the service provider server 300 acquired in step S306 is used to verify the signature. When the verification of the signature fails, the service application unit 214 notifies the service provider server 300 of the error and cancels the processing of FIG. 11. The description is continued below on the assumption that the verification of the signature is successful.

In step S309, the service application unit 214 inquires the user about whether to transfer the access right of the user information to the service provider server 300 and the outsource partner/collaboration partner server 400. In particular, the service application unit 214 displays the user information requirement (user information classification) which is requested by the service provider server 300 and the outsource partner/collaboration partner server 400 and described in the service document acquired in step S306 to inquire the user about whether to permit the access. If the access is not permitted, the service application unit 214 notifies the service provider server 300 of the error and cancels the processing of FIG. 11. In the following description, it is assumed that the access is permitted.

Processing for Transferring Access Right

Figure 12:
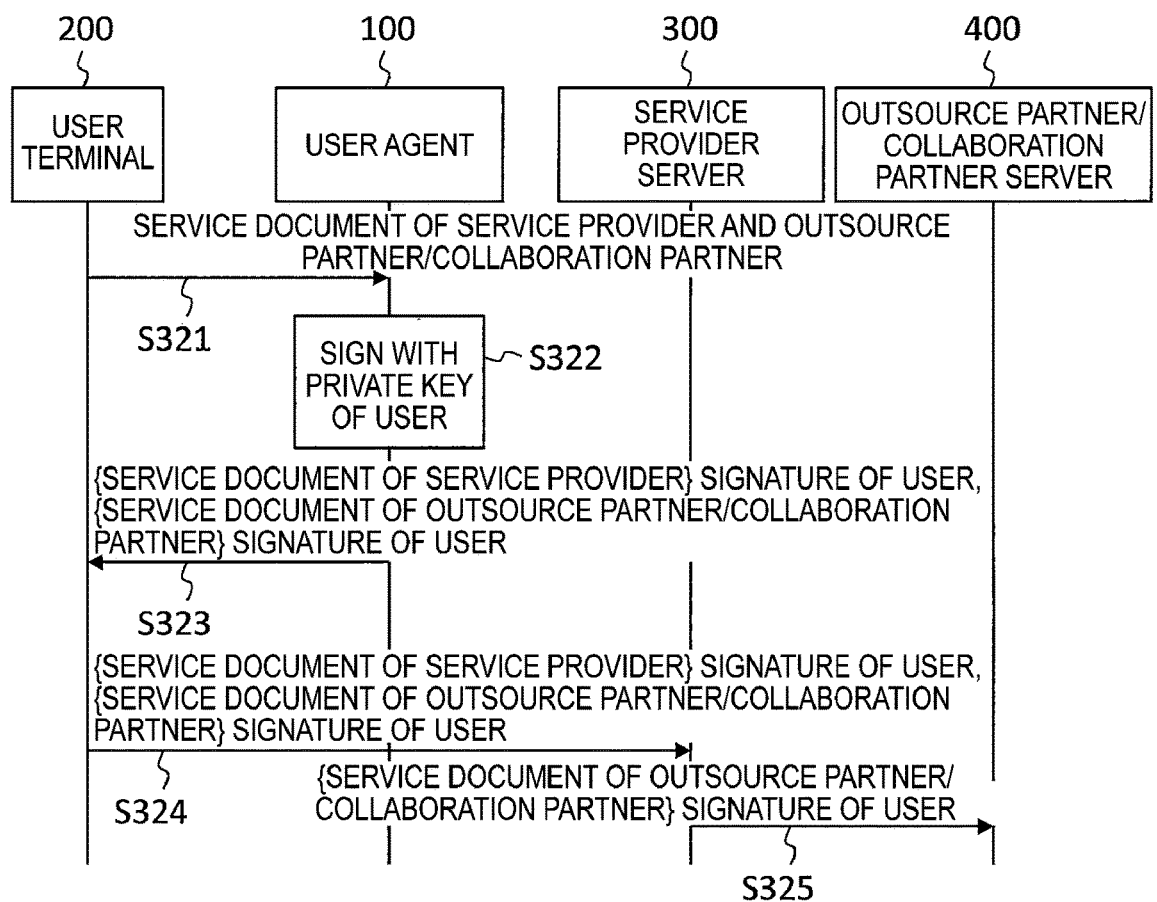
FIG. 12 is a sequence diagram of processing for transferring an access right according to the present embodiment.

FIG. 12 is a sequence diagram of processing for transferring an access right according to the present embodiment. With reference to FIG. 12, contents of the processing in step S142 (see FIG. 2) will be described. Note that in the following description, it is assumed that the user permits to transfer the access right in step S309 (see FIG. 11).

In step S321, the service application unit 214 of the user terminal 200 transmits the service documents of the service provider server 300 and the outsource partner/collaboration partner server 400 to the user agent 100.

In step S322, the privilege transfer unit 114 of the user agent 100 signs each of the service documents received in step S321 with the private key 134 of the user (see FIG. 4). Note that in FIG. 12, the service document signed by the user and issued by the service provider server 300 is described as "{service document of service provider server} signature of user". The service document, signed by user, of the outsource partner/collaboration partner server 400 is described as "{service document of outsource partner/collaboration partner server} signature of user". It is assumed that the signature of the user includes the user identification information 131.

In step S323, the privilege transfer unit 114 transmits the service documents, to which the user signature is added, of the service provider server 300 and the outsource partner/collaboration partner server 400, to the user terminal 200.

In step S324, the service application unit 214 transmits the service documents, to which the user signature is added and which is received in step S323, of the service provider server 300 and the outsource partner/collaboration partner server 400, to the service provider server 300.

In step S325, the user registration unit 313 of the service provider server 300 transmits the service document, to which the user signature is signed and which is received in step S324, of the outsource partner/collaboration partner server 400, to the outsource partner/collaboration partner server 400.

At this point, the service provider server 300 and the outsource partner/collaboration partner server 400 respectively have the service documents of the service provider server 300 and the outsource partner/collaboration partner server 400, to each of which the user signature is added. Each of the service documents includes the identification information of the service provider server 300 or the outsource partner/collaboration partner server 400, the public key, and the user information requirement, to each of which the user signature is added. Thus, the user agent 100 referring to the signed service document is capable of confirming that the user permits the service provider server 300 or the outsource partner/collaboration partner server 400 authenticated with the public key to have the access right to the user information.

Figure 13:
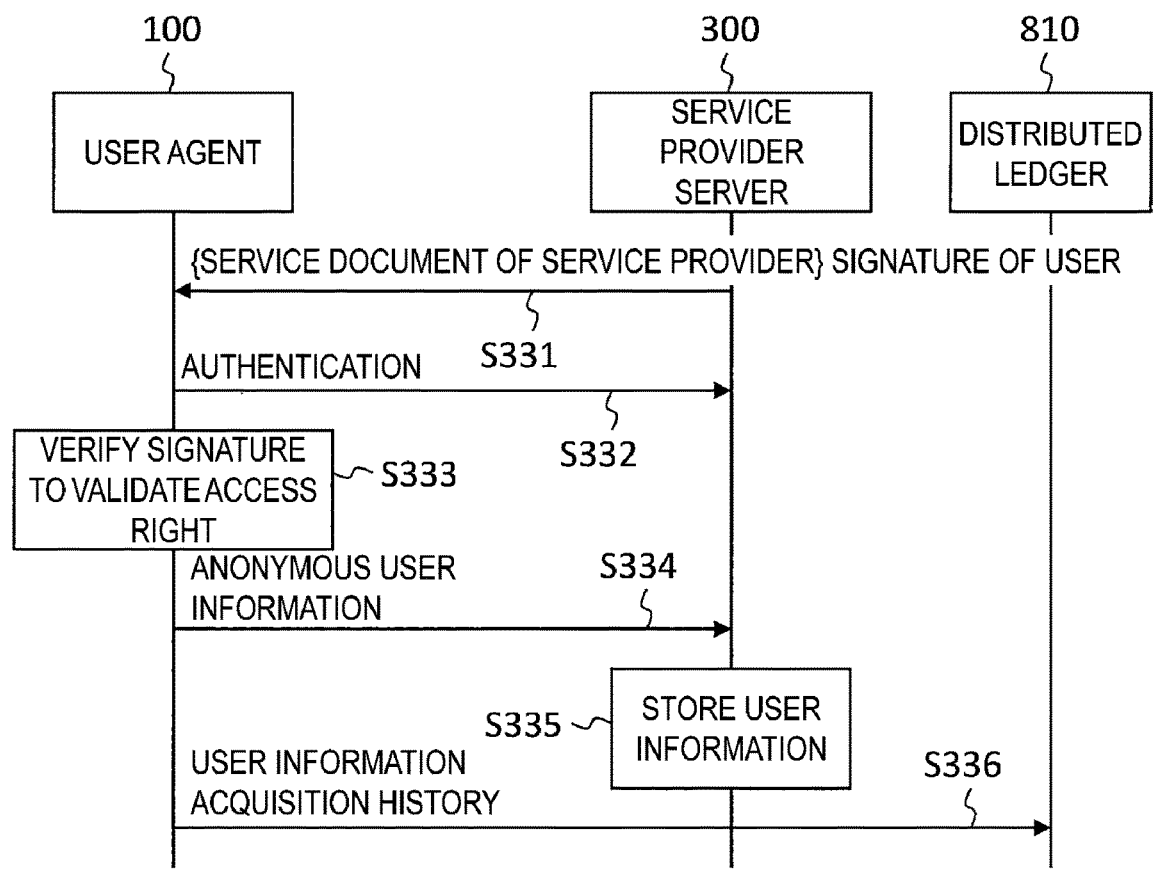
FIG. 13 is a sequence diagram of processing for acquiring user information according to the present embodiment.

Processing for Acquiring User Information and Processing for Recording Acquisition History FIG. 13 is a sequence diagram of processing for acquiring the user information according to the present embodiment. With reference to FIG. 13, contents of the processing in step in steps S143 to S144 (see FIG. 2) will be described.

In step S331, the user information acquisition unit 314 of the service provider server 300 transmits to the user agent 100 the service document, to which the user signature is added, of the user information acquisition unit 314.

In step S332, the user information provision unit 115 of the user agent 100 communicates with the service provider server 300 to perform authentication. In the authentication, for example, challenge-response authentication is employed using the public key included in the service document received in step S331 to perform the authentication. When the authentication fails, the user information provision unit 115 notifies the service provider server 300 of the error and cancels the processing of FIG. 13. The description is continued below on the assumption that the authentication is successful.

In step S333, the user information provision unit 115 verifies the signature of the user added to the service document received in step S331 to validate the access right to the user information. To verify the signature, the public key 133 corresponding to the user identification information included in the signature (see step S322 in FIG. 12) is used.

In step S334, the user information provision unit 115 transmits an anonymous user information to the service provider server 300. Specifically, the user information provision unit 115 acquires, from the user information 137, the user information corresponding to the user information requirement (user information classification) included in the service document. Note that the user information 137 is a record stored in the user information database 130 and the user information 137 in the same record as the public key 133 in step S333 (see FIG. 4). Next, the user information provision unit 115 converts the acquired user information into the user information included in the service document (roughens granularity of the user information/abstracts the user information) to anonymize the user information, and transmit the anonymous user information to the service provider server 300. For example, if the user information included in the service document is a resident prefecture, the resident prefecture out of the address of the user in the user information 137 is anonymized and the anonymous user information is transmitted.

In step S335, the user information acquisition unit 314 stores the received user information into the user information 333 of the service user database 330 (see FIG. 7).

In step S336, the user information provision unit 115 registers the user information acquisition history (acquisition history) with the distributed ledger 810. In particular, the user information provision unit 115 registers a history including a date and time, the identification information of the service provider server 300, the acquired user information (user information (user information classification) described in the service document, for example, a resident prefecture), and the user identification information.

Similarly to the service provider server 300, the outsource partner/collaboration partner server 400 transmits to the user agent 100 the service document, to which the user signature is added, of the outsource partner/collaboration partner server 400 to acquire the user information.

Utilization of Service

After the user completes the application of registration with the service (see step S140 in FIG. 2 and FIGS. 11 to 13), the user uses the user terminal 200 to utilize the service provided by the service provider server 300 and the outsource partner/collaboration partner server 400 (see step S150 in FIG. 2). Note that in the above description, when the user applies for the registration with the service to the service provider server 300, the service provider server 300 and the outsource partner/collaboration partner server 400 acquire the user information; however, this is not limiting. When it is necessary to provide the service, the service provider server 300 and the outsource partner/collaboration partner server 400 may acquire the user information from the user agent 100 by respectively presenting the service documents, to each of which the user signature is added, of the service provider server 300 and the outsource partner/collaboration partner server 400.

Processing for Acquiring Acquisition History

Figure 14:
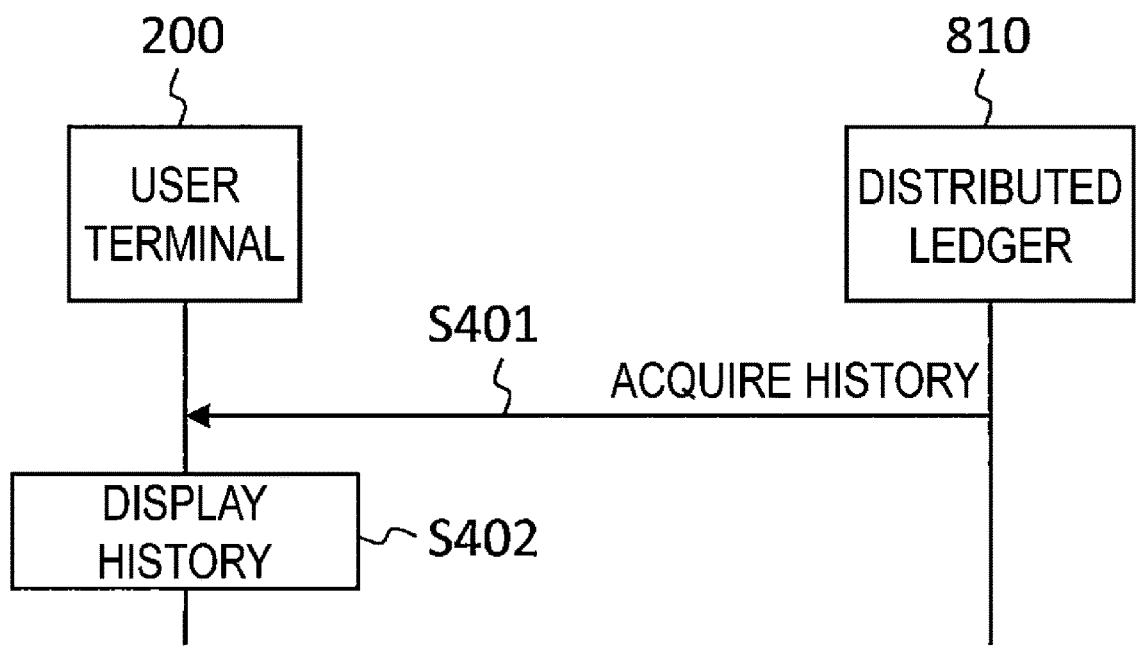
FIG. 14 is a sequence diagram of processing for acquiring a user information acquisition history according to the present embodiment.

FIG. 14 is a sequence diagram of processing of acquiring a user information acquisition history according to the present embodiment. With reference to FIG. 14, contents of the processing in step in step S160 (see FIG. 2) will be described.

In step S401, the user information monitoring unit 215 of the user terminal 200 acquires, from the distributed ledger 810, the user information acquisition history (acquisition history) including the user identification information of the user.

In step S402, the user information monitoring unit 215 displays the acquisition history. In displaying the acquisition history, the user information monitoring unit 215 may separately display the history, according to the date and time and the user information included in the acquisition history, and the service provider server 300 or the outsource partner/collaboration partner server 400.

Characteristic of User Information Management System

In the user information management system 10, the service document of the service provider server 300 includes not only the identification information of the service provider server 300 and the public key but also the user information requirement for providing the service. In registering a user with the service provider server 300 (applying for registration of the user with the service), the user determines whether the service provider server 300 is permitted to access the user information according to the user information requirement (user information classification) described in the service document. If the access is permitted, the user terminal 200 requests the user agent to add a user signature to the service document and transmits the signed service document to the service provider server 300. The signed service document indicates that the user permits the service provider server 300 to access the user information.

The service provider server 300 transmits the signed service document to the user agent 100. The user agent 100 validates the access right by verifying the signature and anonymizes the user information according to the user information requirement described in the service document to transmit the anonymous user information to the service provider server 300. Rather than directly transmitting the user information (also referred to as "registered user information") stored in the user agent 100, the user agent 100 transmits user information obtained by abstracting the user information (by roughing granularity of the user information) stored in the user agent 100 so as to meet the user information requirement described in the service document.

Likewise, the outsource partner/collaboration partner server 400 affiliated with the service provider server 300 acquires the user information. When the service provider server 300 and the outsource partner/collaboration partner server 400 acquire the user information, the user agent 100 records the acquisition history into the distributed ledger 810.

The user terminal 200 acquires and displays the acquisition history related to the user information of the user from the distributed ledger 810. This allows the user to confirm when which service provider server 300 or outsource partner/collaboration partner server 400 acquires what part of the user information of the user. This also allows the service provider server 300 to confirm what user information is acquired by the outsource partner/collaboration partner server 400.

The user refers to the service document to permit the service provider server 300 and the outsource partner/collaboration partner server 400 to access the user information. Thus, the user is capable of controlling, by himself/herself, a transfer destination (distribution destination) of the user information of the user. For example, if the user considers that the user information requirement in the service document is excessive for the service contents (more detailed information is included than is necessary), the user is capable of canceling the application for the registration of the user with the service to refuse the provision of the user information to the service provider server 300 and the outsource partner/collaboration partner server 400.

The user agent 100 abstracts (roughens the granularity of) the user information stored in the user agent 100 and transmits the minimum user information required for providing the service, to the service provider server 300 and the outsource partner/collaboration partner server 400. This allows the privacy of the user to be protected. Even if the user information is leaked from the service provider server 300 and the outsource partner/collaboration partner server 400, it is possible to minimize the leaked information to alleviate the damage.

When the service provider server 300 and the outsource partner/collaboration partner server 400 present the service document signed by the user, it is possible to acquire the user information from the user agent 100. Acquiring the user information at a timepoint when the user information is required to provide the service allows the latest user information to be acquired. In the known art, the user information is acquired during registration of the user (application for a service) and the old user information may possibly remain unchanged.

Modification Example: Access Right Transfer by Service Provider Server

In the embodiment described above, the user refers to the user information described in the service document and determines to permit the service provider server 300 and the outsource partner/collaboration partner server 400 to have the access right to the user information (see step S309 in FIG. 11). Thereafter, the user terminal 200 requests the user agent 100 to sign the service document (steps S321 to S322 in FIG. 12). On the other hand, the user may permit only the service provider server 300 to have the access right to the user information and the service provider server 300 may determine whether the outsource partner/collaboration partner server 400 has the access right.

Figure 15:
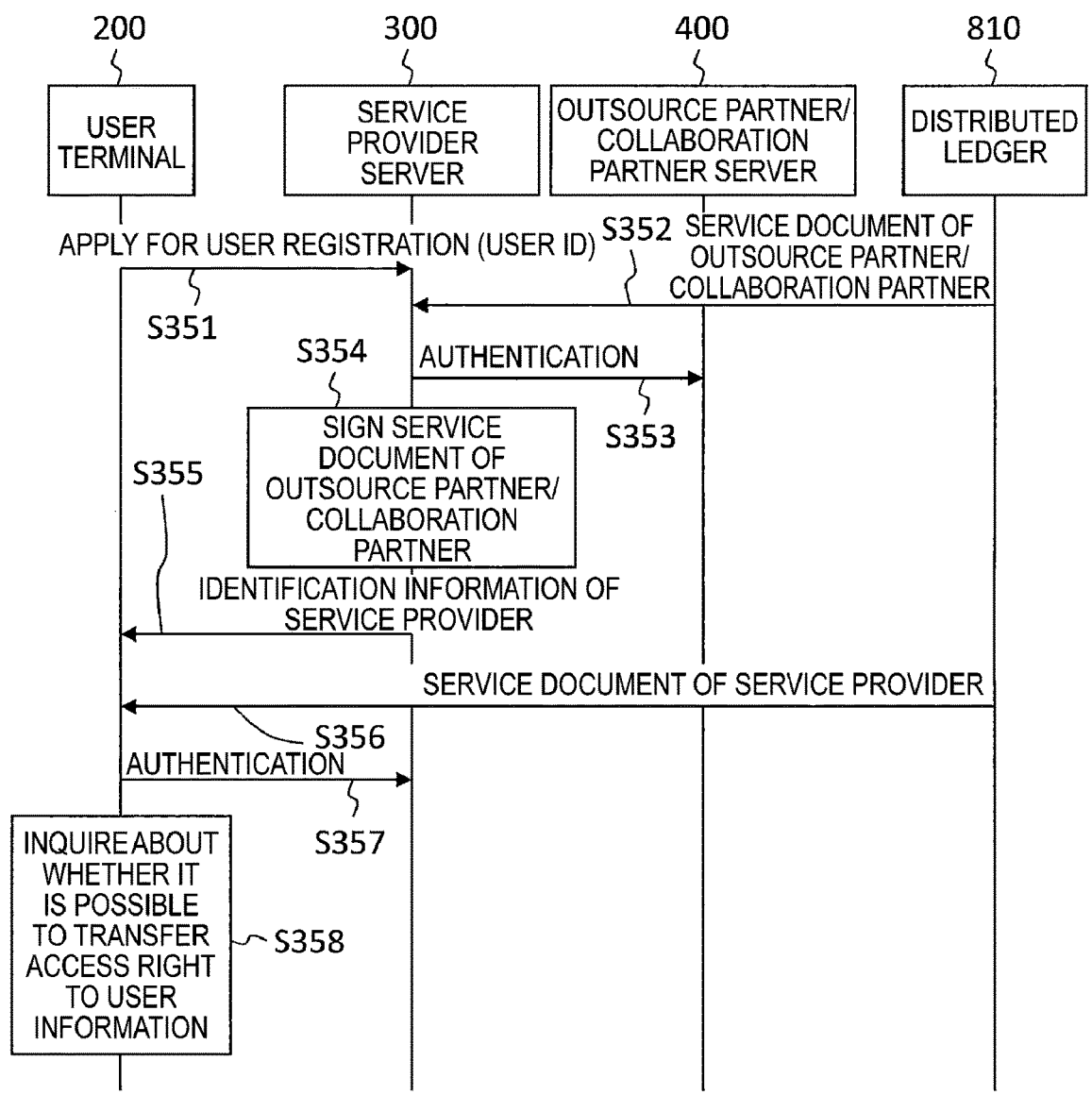
FIG. 15 is a sequence diagram of processing of applying for registration of a user with a service according to a modification example of the present embodiment.
Figure 16:
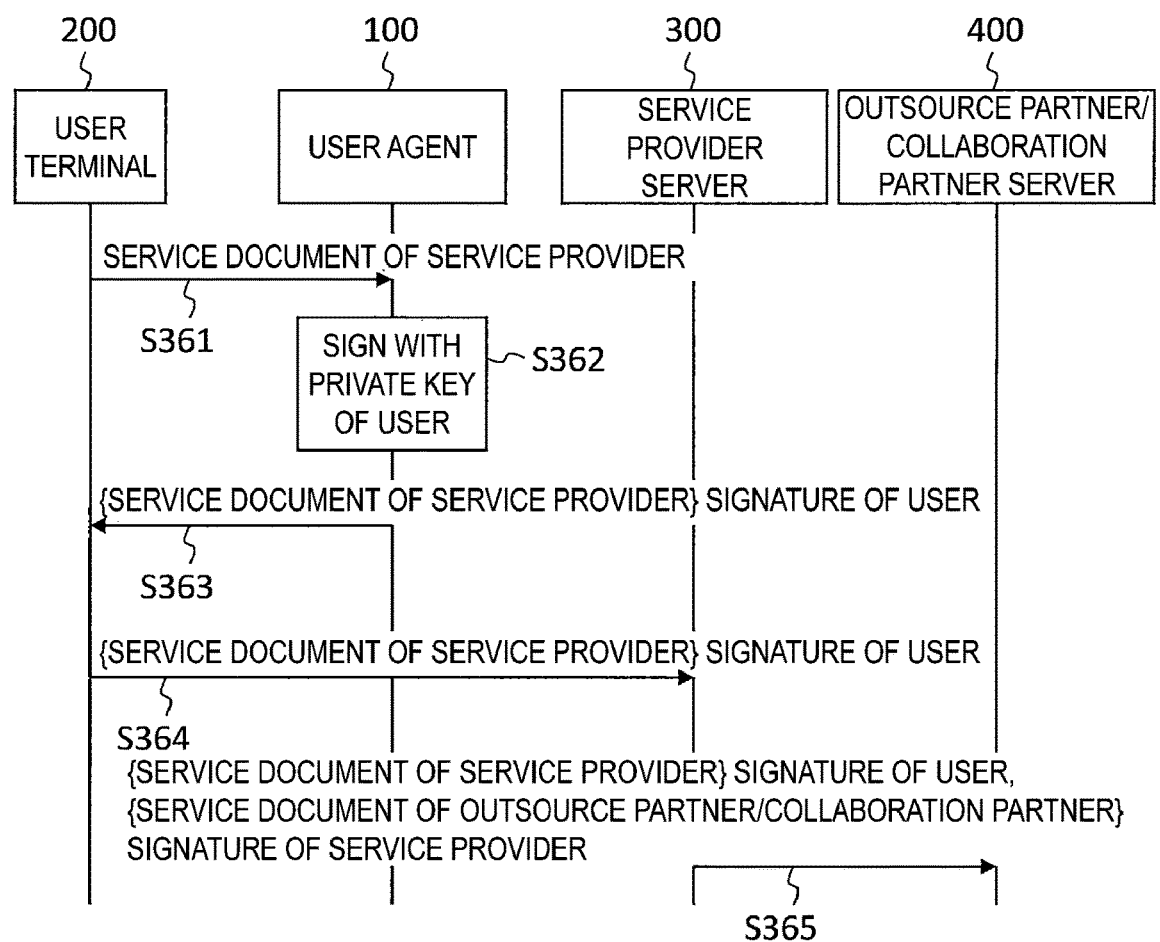
FIG. 16 is a sequence diagram of processing for transferring an access right according to the modification example of the present embodiment.
Figure 17:
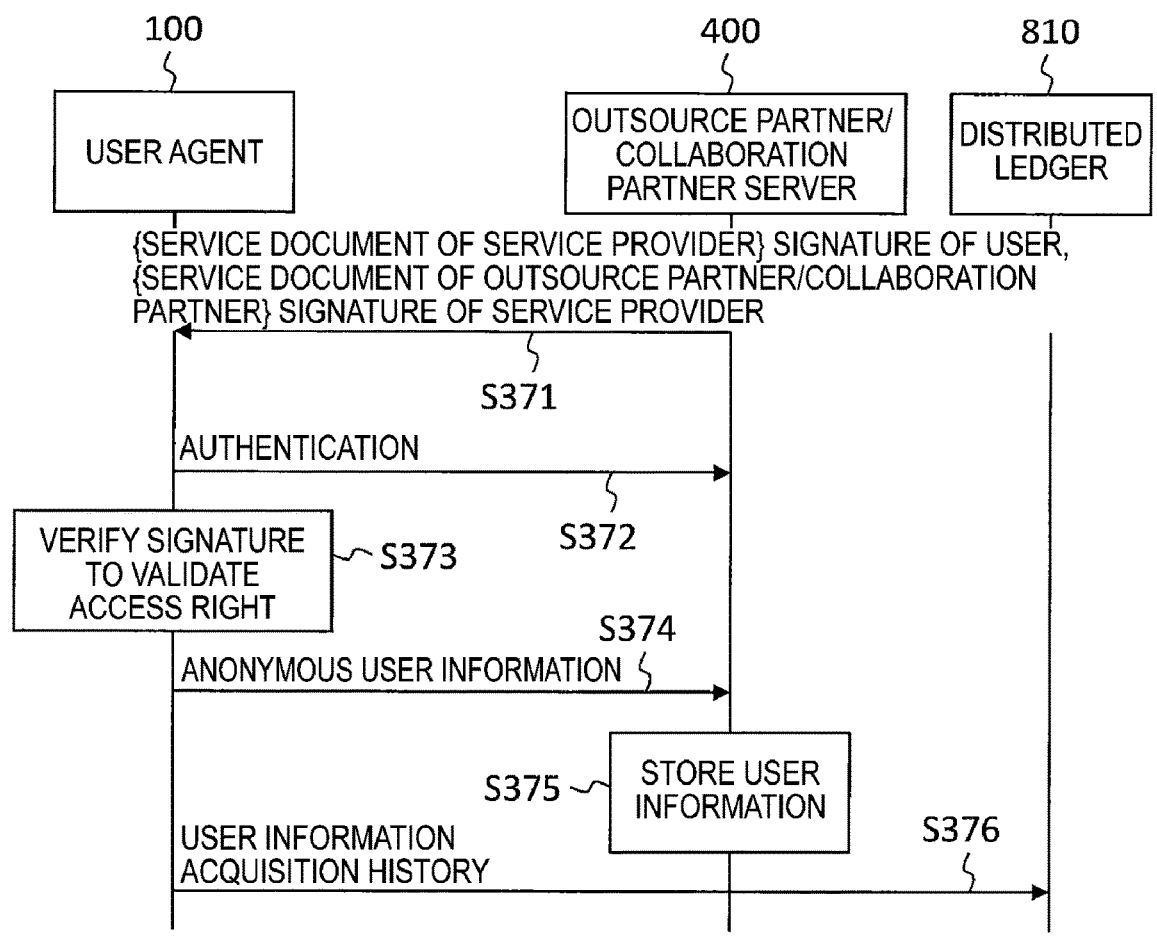
FIG. 17 is a sequence diagram of processing for acquiring user information according to the modification example of the present embodiment.

With reference to FIGS. 15 to 17, differences from FIGS. 11 to 13 will be described below.

Modification Example: Processing for Applying for Registration with Service

FIG. 15 is a sequence diagram of processing for applying for registering the user with the service according to the modification example of the present embodiment.

Steps S351 to S353 are similar to steps S301 to S303 described in FIG. 11, respectively.

In step S354, the user registration unit 313 signs the service document of the outsource partner/collaboration partner server 400 with the private key of the user registration unit 313. Note that in FIG. 15, the service document, signed by the service provider server 300, of the outsource partner/collaboration partner server 400 is described as "{service document of outsource partner/collaboration partner server} signature of service provider".

In step S355, the user registration unit 313 transmits the identification information of the service provider server 300 to the user terminal 200.

In step S356, the service application unit 214 acquires, based on the identification information of the service provider server 300 received in step S355, the service document of the service provider server 300 from the distributed ledger 810.

Step S357 is similar to step S307.

In step S358, the service application unit 214 inquires the user about whether to transfer the access right of the user information to the service provider server 300. In particular, the service application unit 214 displays the user information requirement (user information classification) demanded by the service provider server 300 and described in the service document acquired in step S356 to inquire the user about whether to permit the access. The service application unit 214 alerts the user by pointing out that the user information held by the user agent 100 is acquired also by the outsource partner/collaboration partner server 400 affiliated with the service provider server 300. If the access is not permitted, the service application unit 214 notifies the service provider server 300 of the error and cancels the processing of FIG. 15. In the following description, it is assumed that the access is permitted.

Modification Example: Processing for Transferring Access Right

FIG. 16 is a sequence diagram of processing for transferring the access right according to the modification example of the present embodiment.

Steps S361 to S364 are similar to steps S321 to S324 of FIG. 12, respectively. Note that a service document to be signed with the private key of the user is the service document of the service provider server 300, and the service document of the outsource partner/collaboration partner server 400 is not signed.

In step S365, the user registration unit 313 of the service provider server 300 transmits the service document of the service provider server 300, to which the user signature is added and which is received in step S364, and the service document of the outsource partner/collaboration partner server 400 signed by the user registration unit 313 in step S354 (see FIG. 15), to the outsource partner/collaboration partner server 400.

At this point, the service provider server 300 has the service document, to which the user signature is added, of the service provider server 300. The processing of acquiring the user information by the service provider server 300 is similar to that in FIG. 13. The processing of acquiring the user information by the outsource partner/collaboration partner server 400 will be described below.

The outsource partner/collaboration partner server 400 has the service document, to which the user signature is added, of the service provider server 300 and the service document, to which the signature of the service provider server 300 is added, of the outsource partner/collaboration partner server 400. The user agent 100 referring to the service document, to which the user signature is added, of the service provider server 300 is capable of verifying that the user permits the service provider server 300 to have the access right to the user information. The user agent 100 referring to the service document, signed by the service provider server 300 having the access right, of the outsource partner/collaboration partner server 400 is capable of verifying that the service provider server 300 transfers the access right to the outsource partner/collaboration partner server 400. After the verification, the user agent 100 transmits the user information described in the service document, to the outsource partner/collaboration partner server 400.

Modification Example: Processing for Acquiring User Information

FIG. 17 is a sequence diagram of processing for acquiring the user information according to the modification example of the present embodiment.

In step S371, the user information acquisition unit 314 of the outsource partner/collaboration partner server 400 transmits the service document, to which the user signature is added, of the service provider server 300 and the service document, to which the signature of the service provider server 300 is added, of the outsource partner/collaboration partner server 400, to the user agent 100.

Step S372 is similar to step S332 described in FIG. 13.

In step S373, the user information provision unit 115 verifies the signature of the user added to the service document of the service provider server 300 received in step S371 to validate the access right to the user information. The public key 133 corresponding to the user identification information included in the signature (see step S362 in FIG. 16) is used to verify the signature.

Subsequently, the user information provision unit 115 verifies the signature of the service provider server 300 added to the service document of the outsource partner/collaboration partner server 400. In verifying the signature, the public key included in the service document of the service provider server 300 is used.

If there is a description of outsource partner/collaboration partner servers in the service document of the service provider server 300, the user information provision unit 115 verifies that the outsource partner/collaboration partner servers described in the service document include the outsource partner/collaboration partner server 400 requesting the user information.

Thus, the user agent 100 is capable of verifying the access right of the outsource partner/collaboration partner server 400. The user information permitted to be accessed may be the user information according to the user information requirement described in the service document of the outsource partner/collaboration partner server 400, may be the user information according to the user information requirement described in the service document of the service provider server 300, and may be a common portion between the two pieces of user information. The user may set which is used as the user information.

Steps S374 to S376 are similar to steps S334 to S337.

Characteristic of Modification Example

In the modification example, the user transfers the access right to the service provider server 300. A further transfer of the access right to the outsource partner/collaboration partner server 400 is performed by the service provider server 300. In the above description, the access right is transferred by signing the service document of the outsource partner/collaboration partner server 400 when the user applies for the registration with the service (see step S354 in FIG. 15), but the service document may be signed and the access right may be transferred at another timing, for example, when the service is provided. Thus, the service provider server 300 is capable of cooperating in service with the outsource partner/collaboration partner server 400 different from the outsource partner/collaboration partner server when the user applies for the registration with the service, improving the flexibility and reliability of the service.

As described in step S373, by restricting the user information accessible by the outsource partner/collaboration partner server 400 within the range of the user information of the service provider server 300, the user is capable of limiting the range of the user information to be acquired. In addition, the outsource partner/collaboration partner server 400 is restricted to outsource partner/collaboration partner servers described in the service document of the service provider server 300, thereby it is possible to limit the distribution destination of the user information.

Other Modification Examples

Note that the present invention is not limited to the embodiment described above, and changes can be made without departing from the spirit of the present invention. For example, a valid period may be provided for the signature of the service document added by the user agent 100. In the processing for acquiring user information (see FIGS. 13 and 17), the user agent 100 denies the access to the user information outside the valid period.

Although some embodiments of the present invention have been described above, the embodiments are merely examples and do not limit the technical scope of the present invention. The present invention can take various other embodiments, and various changes such as omission and substitution can be made without departing from the gist of the present invention. The embodiments or modifications thereof are included in the scope or gist of the invention described in the present specification or the like, and are also included in the scope of the inventions defined in the claims and the equivalent scope thereof.

Hardware Configuration

Figure 18:
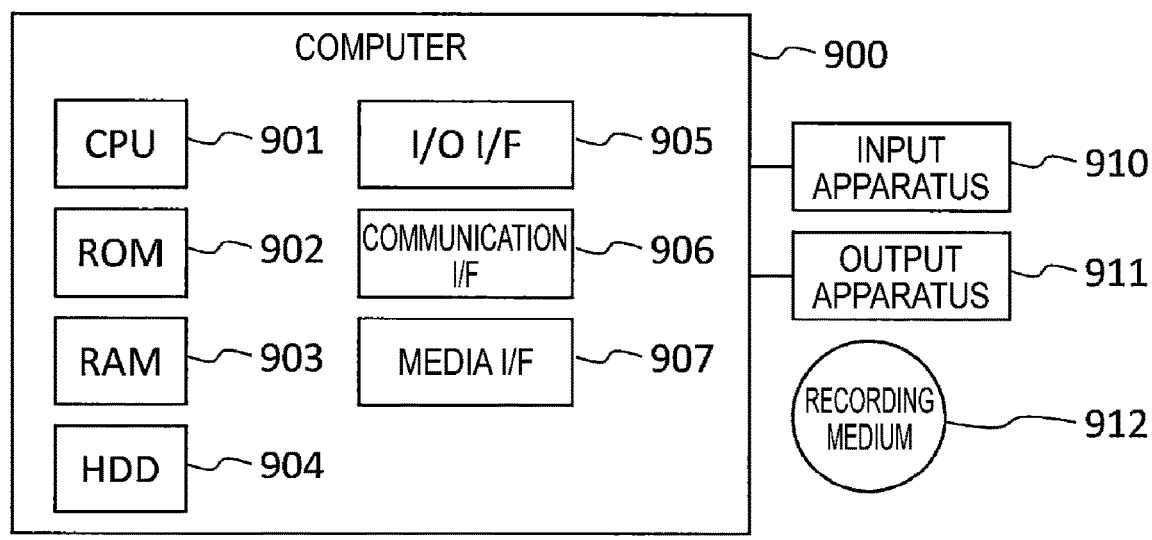
FIG. 18 is a hardware configuration diagram illustrating an example of a computer that implements functions of the user agent according to the present embodiment.

The user agent 100 according to the present embodiment is implemented by a computer 900 configured as illustrated in FIG. 18, for example. FIG. 18 is a hardware configuration diagram illustrating an example of the computer 900 that implements functions of the user agent 100 according to the present embodiment. The computer 900 includes a CPU 901, a read only memory (ROM) 902, a RAM 903, a hard disk 904, an input/output interface 905 (described as I/O I/F in FIG. 18), a communication interface 906, and a media interface 907.

The CPU 901 operates based on a program stored in the ROM 902 or the hard disk 904, and performs control using the control unit 110 of FIG. 3. The ROM 902 stores a boot program executed by the CPU 901 when the computer 900 is started, a program relevant to hardware of the computer 900, and the like.

The CPU 901 controls, via the input/output interface 905, an input apparatus 910 such as a mouse and a keyboard, and an output apparatus 911 such as a display and a printer. The CPU 901 acquires data from the input apparatus 910 via the input/output interface 905, and outputs generated data to the output apparatus 911.

The hard disk 904 stores a program executed by the CPU 901, data used by the program, and the like. The communication interface 906 receives data from another apparatus (not illustrated) (the user terminal 200 and the service provider server 300, for example) via a communication network and outputs the received data to the CPU 901, and transmits data generated by the CPU 901 to another apparatus via the communication network.

The media interface 907 reads a program or data stored in a recording medium 912 and outputs the read program or data to the CPU 901 via the RAM 903. The CPU 901 loads the program from the recording medium 912 onto the RAM 903 via the media interface 907 to execute the loaded program. The recording medium 912 is an optical recording medium such as a digital versatile disc (DVD), a magneto-optical recording medium such as a magnet optical disc (MO), a magnetic recording medium, a conductor memory tape medium, a semiconductor memory, or the like.

For example, in a case where the computer 900 functions as the user agent 100 according to the present embodiment, the CPU 901 of the computer 900 executes the program 121 (see FIG. 3) loaded onto the RAM 903 to realize the function of the user agent 100. The CPU 901 reads the program from the recording medium 912 to executes the program. In addition, the CPU 901 may read the program from another apparatus via a communication network, or may install the program 121 from the recording medium 912 onto the hard disk 904 to execute the program 121.

Effects

Effects of the user information management system 10 will be described below.

The user information management system 10 according to the present embodiment is the user information management system 10 configured to include the user terminal 200 utilized by a user, the user agent 100, and the service provider server 300. The user agent 100 includes the storage unit 120 configured to store the user information database 130 in which the public key 133 and the private key 134 of the user, the user identification information 131, and the user information 137 being a user attribute are associated with each other and stored, and the privilege transfer unit 114 configured to receive from the user terminal 200 a request with a service document including identification information of the service provider server 300 and a user information classification being a classification of the user information requested by the service provider server 300, and generate and transmit back a signed service document obtained by adding a signature to the service document by using the private key 134 of the user of the user terminal 200. The user terminal 200 transmits the signed service document to the service provider server 300, the service provider server 300 transmits the signed service document to the user agent 100, and the user agent 100 further includes the user information provision unit 115 configured to verify the signature of the signed service document by using the public key 133 of the user, and to transmit back to the service provider server 300 registered user information being the user information 137 of the user which is included in the user information database 130 and corresponding to the user information classification included in the signed service document.

According to such a user information management system 10, the service provider server 300 is capable of acquiring the user information (registered user information) of the user, the user information corresponding to the user information classification described in the service document signed with the private key of the user (see FIG. 13). The service provider server 300 is capable of acquiring the user information not only when the user applies for the registration with the service but also when the service is provided to the user. As a result, the service provider server 300 is capable of providing the service, based on the latest user information.

When the user terminal 200 requests the user agent 100 (privilege transfer unit 114) to sign the service document (see step S321 in FIG. 12), the user may refer to the user information classification described in the service document and determine whether to permit the service provider server 300 to have the access to the user information of the user (see step S309 in FIG. 11). The user is capable of controlling (managing) by himself/herself to provide what user information classification of the user to which service provider server 300.

The user information management system 10 according to the present embodiment further includes the distributed ledger 810, and when the registered user information is returned, the user information provision unit 115 records acquisition history including the user identification information 131 and the user information classification included in the signed service document, into the distributed ledger 810.

According to such a user information management system 10, the user terminal 200 is capable of acquiring a record (acquisition history) related to the user from the distributed ledger 810 (see step S401 in FIG. 14). When the user refers to the record, the user is capable of confirming (managing) what part of the user information of the user is provided to which service provider server 300.

The user information provision unit 115 according to the present embodiment acquires the registered user information from the user information database 130, abstracts the registered user information into the user information corresponding to the user information classification included in the signed service document, and returns the abstracted registered user information to the service provider server.

According to such a user information management system 10, the user agent 100 returns the abstracted user information having a rough granularity corresponding to the user information classification described in the service document rather than the user information (registered user information) itself stored in the user information database 130, to the service provider server 300 (see step S334 in FIG. 13). It is possible to provide the minimum user information described in the service document and required for providing the service. Thus, even if the user information leaks from the service provider server 300, it is possible to reduce the amount of leaked information as small as possible to minimize the damage. For the user, it is possible to utilize the service by providing the minimum required amount of user information. It is possible to enhance the level of privacy protection relative to the known art (for example, SSI).

The user information management system 10 according to the present embodiment further includes a related service provider server (outsource partner/collaboration partner server 400) configured to provide a service in collaboration with the service provider server 300, the signed service document further includes the public key of the service provider server 300, the service provider server 300 generates a signed related service document obtained by adding a signature to a related service document by using the private key of the service provider server 300, the related service document being a service document including the identification information of the related service provider server and a user information classification requested by the related service provider server, and transmits the signed related service document with the signed service document to the related service provider server, the related service provider server transmits the signed service document and the signed related service document to the user agent 100, the user information provision unit 115 verifies the signature of the signed service document by using the public key 133 of the user, verifies the signature of the signed related service document by using the public key of the service provider server 300 included in the signed service document, and transmits back to the related service provider server the registered user information corresponding to at least one of the user information classification included in the signed service document, the user information classification included in the signed related service document, or the user information classification common to the user information classification included in the signed service document and the user information classification included in the signed related service document.

According to such a user information management system 10, the service provider server 300 signs the service document of the affiliated related service provider server (outsource partner/collaboration partner server 400) to enable the related service provider server to acquire the user information (registered user information) (see FIG. 17). Not only when the user applies for registration with the service, but also when the service is provided, the service provider server 300 can determine the related service provider server and sign the service document of the related service provider server. The service provider server 300 may select a related service provider server different from that when the user applies for registration with the service, and may select a related service provider server according to an operation status of the related service provider server when the service is provided, improving the flexibility and reliability of the service. Even when the related service provider server is changed, the user need not to respond to such a change, and the service becomes more convenience for the user.

Thus, it is possible to limit the range of the user information provided by the user agent 100 to the user information according to the user information requirement described in the service document of the service provider server 300, to the user information according to the user information requirement described in the service document of the outsource partner/collaboration partner server 400, and to a common portion between the two pieces of user information described in the two respective service documents. When the user information provision unit 115 sets a condition that the user information is provided, the user is capable of controlling (managing) by himself/herself what part of the user information of the user is provided to which outsource partner/collaboration partner server 400.

The user information management system 10 according to the present embodiment further includes a related service provider server (outsource partner/collaboration partner server 400) configured to provide a service in collaboration with the service provider server 300. The privilege transfer unit 114 receives from the user terminal 200 a request with a related service document including identification information of the related service provider server and a user information classification requested by the related service provider server, and generates and transmits back a signed related service document obtained by adding a signature to the related service document by using the private key of the user of the user terminal 200, the user terminal 200 transmits the signed related service document to the service provider server 300, the service provider server 300 transmits the signed related service document to the related service provider server, the related service provider server transmits the signed related service document to the user agent 100, and the user information provision unit 115 verifies the signature of the signed related service document by using the public key of the user and transmits back to the related service provider server (outsource partner/collaboration partner server 400), registered user information which is corresponding to the user information classification included in the signed related service document and included in the user information database 130.

According to such a user information management system 10, even in a case where the service is provided not solely by the service provider server 300 but by a plurality of servers including the service provider server 300 and the related service provider server working in collaboration, the related service provider server is capable of acquiring the user information (registered user information) of the user, corresponding to the user information classification described in the service document signed with the private key of the user.

When the user terminal 200 requests the user agent 100 (privilege transfer unit 114) to add the signature to the service document, the user may refer to the user information classification described in the service document to determine whether to permit the related service provider server (outsource partner/collaboration partner server 400) to have the access to the user information of the user. The user is capable of controlling (managing) by himself/herself from which server the service is provided and what user information classification of the user is provided to which server (service provider server 300 and related service provider server).

REFERENCE SIGNS LIST

10 User information management system
 100 User agent
 111 Key management unit
 112 User registration unit
 113 User information registration unit
 114 Privilege transfer unit
 115 User information provision unit
 130 User information database
 200 User terminal
 300 Service provider server
 400 Outsource partner/collaboration partner server (related service provider server)
 810 Distributed ledger
 850 User information issuance entity server
 860 User verification entity server
 870 Service provider verification entity server

The invention claimed is:

1. A user information management system comprising a user terminal used by a user, a user agent, a service provider server comprising at least one processor, and a related service provided server comprising at least one processor, wherein
the user agent includes:
a memory configured to store a user information database in which a public key and a private key of the user, user identification information, and user information being a user attribute are associated with each other and stored; and
a processor configured to;
receive, from the user terminal, a request with a service document including identification information of the service provider server and a user information classification being a classification of the user information requested by the service provider server, and
generate and transmit back a signed service document obtained by adding a signature to the service document by using the private key of the user of the user terminal, wherein:
the user terminal is configured to transmit the signed service document to the service provider server,
the service provider server is configured to transmit the signed service document to the user agent,
the processor of the user agent is further configured to:
verify the signature of the signed service document by using the public key of the user, and
transmit, back to the service provider server, registered user information being the user information of the user which is included in the user information database and corresponding to the user information classification included in the signed service document,
the related service provider server is configured to provide a service in collaboration with the service provider server,
the processor of the user agent is further configured to:
receive, from the user terminal, a request with a related service document including identification information of the related service provider server and a user information classification requested by the related service provider server, and generate and transmit back a signed related service document obtained by adding a signature to the related service document by using the private key of the user of the user terminal, the user terminal is further configured to transmit the signed related service document to the service provider server, the service provider server is further configured to transmit the signed related service document to the related service provider server, the related service provider server is further configured to transmit the signed related service document to the user agent, and the processor of the user agent is further configured to:
verify the signature of the signed related service document by using the public key of the user, and
transmit, back to the related service provider server, registered user information corresponding to the user information classification included in the signed related service document and included in the user information database.

2. The user information management system according to claim 1, further comprising:
a distributed ledger, wherein the processor of the user agent records, when transmitting back the registered user information, an acquisition history including the user identification information and the user information classification included in the signed service document, into the distributed ledger.

3. The user information management system according to claim 1, wherein the processor of the user agent acquires the registered user information from the user information database, abstracts the registered user information into user information corresponding to the user information classification included in the signed service document, and transmits back the abstracted registered user information to the service provider server.

4. The user information management system according to claim 1, further comprising: a related service provider server configured to provide a service in collaboration with the service provider server, wherein
the signed service document further includes a public key of the service provider server,
the service provider server generates a signed related service document obtained by adding a signature to a related service document by using the private key of the service provider server, the related service document being a service document including identification information of the related service provider server and a user information classification requested by the related service provider server, and transmits the signed related service document with the signed service document to the related service provider server,
the related service provider server transmits the signed service document and the signed related service document to the user agent, and
the processor of the user agent verifies the signature of the signed service document by using the public key of the user, verifies the signature of the signed related service document by using the public key of the service provider server included in the signed service document, and transmits back to the related service provider server the registered user information corresponding to at least one of the user information classification included in the signed service document, the user information classification included in the signed related service document, or the user information classification common to the user information classification included in the signed service document and the user information classification included in the signed related service document.

5. A user information management method for a user information management system that comprises a user terminal used by a user, a user agent comprising at least one computer processor, and a service provider server comprising at least one computer processor, the user information management method comprising:

receiving, by the user agent and from the user terminal, a request with a service document including identification information of the service provider server and a user information classification being a classification of the user information requested by the service provider server, and generating and transmitting back a signed service document obtained by adding a signature to a service document by using a private key of the user of the user terminal, the user agent including a memory configured to store a user information database in which a public key and a private key of the user, user identification information, and user information being a user attribute are associated with each other and stored;

transmitting, by the user terminal, the signed service document to the service provider server;

transmitting, by the service provider server, the signed service document to the user agent;

verifying, by the user agent, the signature of the signed service document by using the public key of the user, and transmitting, back to the service provider server, registered user information being the user information of the user which is included in the user information database and corresponding to the user information classification included in the signed service document, wherein the signed service document further includes a public key of the service provider server;

generating, by the service provider server, a signed related service document obtained by adding a signature to a related service document by using the private key of the service provider server, the related service document being a service document including identification information of a related service provider server and a user information classification requested by the related service provider server;

transmitting, by the service provider server, the signed related service document with the signed service document to the related service provider server;

transmitting, by the related service provider server, the signed service document and the signed related service document to the user agent, and verifying, by the user agent, the signature of the signed service document by using the public key of the user;

verifying, by the user agent, the signature of the signed related service document by using the public key of the service provider server included in the signed service document;

transmitting, by the user agent and back to the related service provider server, the registered user information corresponding to at least one of the user information classification included in the signed service document, the user information classification included in the signed related service document, or the user information classification common to the user information classification included in the signed service document and the user information classification included in the signed related service document.

6. A user agent of a user information management system comprising:
- a memory configured to store a user information database in which a public key and a private key of the user, user identification information, and user information being a user attribute are associated with each other and stored; and
- a processor configured to receive, from a user terminal, a request with a service document including identification information of a service provider server and a user information classification being a classification of the user information requested by the service provider server, and generate and transmit back a signed service document obtained by adding a signature to a service document by using the private key of the user of the user terminal,
- wherein the processor is further configured to;
  - receive the signed service document from the service provider server, verify the signature of the signed service document by using the public key of the user, and
  - transmit, back to the service provider server, registered user information being the user information of the user which is included in the user information database and corresponding to the user information classification included in the signed service document a related service provider server configured to provide a service in collaboration with the service provider server, wherein
- the signed service document further includes a public key of the service provider server,
- the service provider server is configured to generate a signed related service document obtained by adding a signature to a related service document by using the private key of the service provider server, the related service document being a service document including identification information of the related service provider server and a user information classification requested by the related service provider server, and transmits the signed related service document with the signed service document to the related service provider server,
- the related service provider server is configured to transmit the signed service document and the signed related service document to the user agent, and
- the processor of the user agent is configured to:
  - verify the signature of the signed service document by using the public key of the user,
  - verify the signature of the signed related service document by using the public key of the service provider server included in the signed service document, and
  - transmit, back to the related service provider server, the registered user information corresponding to at least one of the user information classification included in the signed service document, the user information classification included in the signed related service document, or the user information classification common to the user information classification included in the signed service document and the user information classification included in the signed related service document, wherein the related service provider server comprise at least one processor.

* * * * *